(12) United States Patent
Carasso et al.

(10) Patent No.: US 11,822,372 B1
(45) Date of Patent: Nov. 21, 2023

(54) AUTOMATED EXTRACTION RULE MODIFICATION BASED ON REJECTED FIELD VALUES

(71) Applicant: SPLUNK Inc., San Francisco, CA (US)

(72) Inventors: R. David Carasso, San Rafael, CA (US); Micah James Delfino, San Francisco, CA (US); Johnvey Hwang, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/733,617

(22) Filed: Apr. 29, 2022

Related U.S. Application Data

(63) Continuation of application No. 15/582,669, filed on Apr. 29, 2017, now Pat. No. 11,514,086, which is a
(Continued)

(51) Int. Cl.
*G06F 16/28* (2019.01)
*G06F 3/0482* (2013.01)
(Continued)

(52) U.S. Cl.
CPC .......... *G06F 16/287* (2019.01); *G06F 3/0482* (2013.01); *G06F 3/04842* (2013.01); *G06F 16/248* (2019.01); *G06F 16/332* (2019.01); *G06F 16/334* (2019.01); *G06F 16/338* (2019.01); *G06F 16/34* (2019.01);
(Continued)

(58) Field of Classification Search
CPC ...... G06F 16/287; G06F 16/334; G06F 16/93; G06F 16/34; G06F 16/332; G06F 16/338; G06F 16/951; G06F 16/248; G06F 40/166; G06F 40/169; G06F 40/174;
(Continued)

(56) References Cited

U.S. PATENT DOCUMENTS 5,550,971 A   8/1996 Brunner et al.
5,761,389 A   6/1998 Maeda et al.
(Continued)

OTHER PUBLICATIONS

Splunk, "Splunk User Manual", Sep. 22, 2011, pp. 100-140 (Year: 2011).*
(Continued)

*Primary Examiner* — Matthew J Ellis
(74) *Attorney, Agent, or Firm* — Shook, Hardy & Bacon L.L.P.

(57) ABSTRACT

Embodiments are directed towards real time display of event records and extracted values based on at least one extraction rule, such as a regular expression. A user interface may be employed to enable a user to have an extraction rule automatically generate and/or to manually enter an extraction rule. The user may be enabled to manually edit a previously provided extraction rule, which may result in real time display of updated extracted values. The extraction rule may be utilized to extract values from each of a plurality of records, including event records of unstructured machine data. Statistics may be determined for each unique extracted value, and may be displayed to the user in real time. The user interface may also enable the user to select at least one unique extracted value to display those event records that include an extracted value that matches the selected value.

18 Claims, 12 Drawing Sheets

Related U.S. Application Data continuation of application No. 15/011,392, filed on Jan. 29, 2016, now abandoned, which is a continuation of application No. 14/816,038, filed on Aug. 2, 2015, now Pat. No. 10,282,463, which is a continuation of application No. 13/748,360, filed on Jan. 23, 2013, now Pat. No. 9,152,929.

(51) Int. Cl.

| | | |
|---|---|---|
| *G06F 16/34* | (2019.01) | |
| *G06F 16/93* | (2019.01) | |
| *G06F 16/248* | (2019.01) | |
| *G06F 16/332* | (2019.01) | |
| *G06F 16/33* | (2019.01) | |
| *G06F 16/338* | (2019.01) | |
| *G06F 16/951* | (2019.01) | |
| *G06Q 10/0637* | (2023.01) | |
| *G06F 40/166* | (2020.01) | |
| *G06F 40/169* | (2020.01) | |
| *G06F 40/174* | (2020.01) | |
| *G06Q 10/00* | (2023.01) | |
| *G06F 3/04842* | (2022.01) | |

(52) U.S. Cl.
CPC .......... *G06F 16/93* (2019.01); *G06F 16/951* (2019.01); *G06F 40/166* (2020.01); *G06F 40/169* (2020.01); *G06F 40/174* (2020.01); *G06Q 10/00* (2013.01); *G06Q 10/0637* (2013.01)

(58) Field of Classification Search
CPC ... G06F 3/0482; G06F 3/04842; G06Q 10/00; G06Q 10/0637; Y04S 10/50
See application file for complete search history.

(56) References Cited

U.S. PATENT DOCUMENTS

| | | |
|---|---|---|
| 5,764,975 A | 6/1998 | Taniguchi et al. |
| 5,913,032 A | 6/1999 | Schwartz et al. |
| 6,049,777 A | 4/2000 | Sheena et al. |
| 6,112,186 A | 8/2000 | Bergh et al. |
| 6,118,936 A | 9/2000 | Lauer et al. |
| 6,173,418 B1 | 1/2001 | Fujino et al. |
| 6,208,720 B1 | 3/2001 | Curtis et al. |
| 6,311,194 B1 | 10/2001 | Sheth et al. |
| 6,347,374 B1 | 2/2002 | Drake et al. |
| 6,374,251 B1 | 4/2002 | Fayyad et al. |
| 6,549,208 B2 | 4/2003 | Maloney et al. |
| 6,609,128 B1 | 8/2003 | Underwood |
| 6,718,535 B1 | 4/2004 | Underwood |
| 6,839,669 B1 | 1/2005 | Gould et al. |
| 6,954,756 B2 | 10/2005 | Arning et al. |
| 7,035,925 B1 | 4/2006 | Nareddy et al. |
| 7,085,682 B1 | 8/2006 | Heller et al. |
| 7,100,195 B1 | 8/2006 | Underwood |
| 7,136,880 B2 | 11/2006 | Wilkins et al. |
| 7,219,239 B1 | 5/2007 | Njemanze et al. |
| 7,376,969 B1 | 5/2008 | Njemanze et al. |
| 7,389,306 B2 | 6/2008 | Schuetze et al. |
| 7,503,012 B2 | 3/2009 | Chen et al. |
| 7,562,069 B1 * | 7/2009 | Chowdhury ........ G06F 16/2425 |
| 7,644,414 B2 | 1/2010 | Smith et al. |
| 7,650,512 B2 | 1/2010 | Karimisetty et al. |
| 7,650,638 B1 | 1/2010 | Njemanze et al. |
| 7,702,639 B2 * | 4/2010 | Stanley ............... G06F 16/20 707/999.1 |
| 7,769,899 B2 | 8/2010 | Grabarnik et al. |
| 7,779,021 B1 | 8/2010 | Smith et al. |
| 7,805,482 B2 | 9/2010 | Schiefer |
| 7,809,131 B1 | 10/2010 | Njemanze et al. |
| 7,899,783 B1 | 3/2011 | Xu et al. |
| 7,950,062 B1 | 5/2011 | Ren et al. |
| 7,958,164 B2 | 6/2011 | Ivanov et al. |
| 8,022,987 B2 | 9/2011 | Ko et al. |
| 8,112,398 B1 | 2/2012 | Hernandez |
| 8,121,973 B2 | 2/2012 | Anderson et al. |
| 8,200,506 B2 | 6/2012 | Kil |
| 8,412,696 B2 | 4/2013 | Zhang et al. |
| 8,442,950 B2 | 5/2013 | D'Souza et al. |
| 8,442,982 B2 | 5/2013 | Jacobson et al. |
| 8,458,612 B2 | 6/2013 | Chatterjee et al. |
| 8,516,008 B1 | 8/2013 | Marquardt et al. |
| 8,553,993 B2 | 10/2013 | Flesselles |
| 8,578,500 B2 | 11/2013 | Long |
| 8,589,403 B2 | 11/2013 | Marquardt et al. |
| 8,682,925 B1 | 3/2014 | Marquardt et al. |
| 8,700,658 B2 | 4/2014 | Rambhia et al. |
| 8,713,000 B1 | 4/2014 | Elman et al. |
| 8,751,855 B2 | 6/2014 | Yairi et al. |
| 8,752,178 B2 | 6/2014 | Coates et al. |
| 8,788,526 B2 | 7/2014 | Neels et al. |
| 8,806,361 B1 | 8/2014 | Noel et al. |
| 8,826,434 B2 | 9/2014 | Merza |
| 8,965,889 B2 | 2/2015 | Chan et al. |
| 9,037,667 B2 | 5/2015 | Rivkin |
| 9,077,715 B1 | 7/2015 | Satish et al. |
| 9,124,612 B2 | 9/2015 | Vasan et al. |
| 9,130,971 B2 | 9/2015 | Vasan et al. |
| 9,185,007 B2 | 11/2015 | Fletcher et al. |
| 9,189,064 B2 | 11/2015 | Chaudhri et al. |
| 9,215,240 B2 | 12/2015 | Merza et al. |
| 9,262,357 B2 | 2/2016 | Accapadi et al. |
| 9,269,095 B1 | 2/2016 | Chan et al. |
| 9,270,518 B2 | 2/2016 | Muro et al. |
| 9,292,361 B1 | 3/2016 | Chitilian et al. |
| 9,298,854 B2 * | 3/2016 | Ikawa ............... G06F 16/2477 |
| 9,363,149 B1 | 6/2016 | Chauhan et al. |
| 9,516,052 B1 | 12/2016 | Chauhan et al. |
| 9,582,557 B2 | 2/2017 | Carasso et al. |
| 9,588,667 B2 | 3/2017 | Singhal et al. |
| 9,740,788 B2 | 8/2017 | Blank, Jr. et al. |
| 9,747,010 B2 | 8/2017 | Prabhat et al. |
| 9,778,834 B2 | 10/2017 | Evans et al. |
| 9,798,952 B2 | 10/2017 | Kawazu |
| 9,864,797 B2 | 1/2018 | Fletcher et al. |
| 9,875,319 B2 | 1/2018 | Wolfram et al. |
| 9,904,456 B2 | 2/2018 | Xie et al. |
| 9,922,084 B2 | 3/2018 | Robichaud |
| 9,922,099 B2 | 3/2018 | Lamas et al. |
| 9,923,767 B2 | 3/2018 | Dickey |
| 9,967,351 B2 | 5/2018 | Maheshwari et al. |
| 9,977,803 B2 | 5/2018 | Robichaud et al. |
| 9,996,446 B2 | 6/2018 | Lefor et al. |
| 10,009,391 B1 | 6/2018 | Smith et al. |
| 10,019,496 B2 | 7/2018 | Bingham et al. |
| 10,026,045 B1 | 7/2018 | Portnoy et al. |
| 10,031,905 B2 | 7/2018 | Fu et al. |
| 10,061,832 B2 | 8/2018 | Brown et al. |
| 10,127,255 B1 | 11/2018 | Campbell et al. |
| 10,127,258 B2 | 11/2018 | Lamas et al. |
| 10,225,136 B2 | 3/2019 | Bingham et al. |
| 10,229,150 B2 | 3/2019 | Marquardt et al. |
| 10,248,739 B2 | 4/2019 | Hamada |
| 10,318,541 B2 | 6/2019 | Bingham et al. |
| 10,353,957 B2 | 7/2019 | Bingham et al. |
| 10,387,396 B2 | 8/2019 | Marquardt et al. |
| 10,409,794 B2 | 9/2019 | Marquardt et al. |
| 10,417,120 B2 | 9/2019 | Maag et al. |
| 10,474,674 B2 | 11/2019 | Marquardt et al. |
| 10,565,220 B2 | 2/2020 | Porath et al. |
| 10,585,788 B2 | 3/2020 | Nallabothula et al. |
| 10,614,132 B2 | 4/2020 | Bingham et al. |
| 10,621,762 B2 | 4/2020 | Donalek et al. |
| 10,672,161 B2 | 6/2020 | Maruyama et al. |
| 10,698,896 B2 | 6/2020 | Halterman et al. |
| 10,771,486 B2 | 9/2020 | Murphey et al. |
| 10,775,976 B1 | 9/2020 | Abdul-Jawad et al. |
| 10,776,441 B1 | 9/2020 | Echeverria et al. |
| 10,778,712 B2 | 9/2020 | Chauhan et al. |
| 10,783,195 B2 | 9/2020 | Musuluri |

(56) References Cited

U.S. PATENT DOCUMENTS

| | | |
|---|---|---|
| 10,795,555 B2 | 10/2020 | Burke et al. |
| 10,832,456 B1 | 11/2020 | Levy |
| 10,848,510 B2 | 11/2020 | Chauhan et al. |
| 10,885,450 B1 | 1/2021 | Kaitha |
| 10,896,205 B2 | 1/2021 | Krishna et al. |
| 10,915,338 B2 | 2/2021 | Awrence |
| 10,915,583 B2 | 2/2021 | Robichaud et al. |
| 10,922,083 B2 | 2/2021 | Balasubramanian et al. |
| 10,922,341 B2 | 2/2021 | De Boer |
| 10,922,493 B1 | 2/2021 | Das et al. |
| 10,922,660 B2 | 2/2021 | Rakshit et al. |
| 10,922,892 B1 | 2/2021 | Bhushan et al. |
| 10,942,774 B1 | 3/2021 | Aleti et al. |
| 10,985,970 B1 | 4/2021 | Goyal et al. |
| 10,997,180 B2 | 5/2021 | James et al. |
| 10,997,190 B2 | 5/2021 | Porath et al. |
| 10,997,192 B2 | 5/2021 | Boster et al. |
| 10,999,164 B1 | 5/2021 | Sridhar et al. |
| 11,061,918 B2 | 7/2021 | Miller et al. |
| 11,138,191 B1 | 10/2021 | De Boer |
| 11,151,125 B1 | 10/2021 | Dwivedi et al. |
| 11,194,564 B1 | 12/2021 | Dwivedi et al. |
| 11,222,066 B1 | 1/2022 | Batsakis et al. |
| 11,226,964 B1 | 1/2022 | Cairney et al. |
| 11,231,840 B1 | 1/2022 | Burke et al. |
| 11,232,100 B2 | 1/2022 | Bhattacharjee et al. |
| 11,245,581 B2 | 2/2022 | Hsiao et al. |
| 11,263,229 B1 | 3/2022 | Basavaiah et al. |
| 11,269,876 B1 | 3/2022 | Basavaiah et al. |
| 11,327,827 B1 | 5/2022 | Satish et al. |
| 11,386,133 B1 | 7/2022 | Neels et al. |
| 11,526,504 B1 | 12/2022 | Moshgabadi et al. |
| 11,537,942 B1 | 12/2022 | Vogler-ivashchanka et al. |
| 2001/0032205 A1 | 10/2001 | Kubaitis |
| 2002/0049740 A1 | 4/2002 | Arning et al. |
| 2002/0049838 A1 | 4/2002 | Sylor et al. |
| 2002/0054101 A1 | 5/2002 | Beatty |
| 2002/0013351 A1 | 9/2002 | Townsend et al. |
| 2003/0006121 A1 | 3/2003 | Smith et al. |
| 2003/0115333 A1 | 6/2003 | Cohen et al. |
| 2003/0120475 A1 | 6/2003 | Nakamura |
| 2003/0126056 A1 | 7/2003 | Hausman et al. |
| 2003/0167192 A1 | 9/2003 | Santos et al. |
| 2003/0187821 A1 | 10/2003 | Cotton et al. |
| 2004/0001049 A1 | 1/2004 | Bradley et al. |
| 2004/0078359 A1 | 4/2004 | Bolognese et al. |
| 2004/0133566 A1 | 7/2004 | Ishiguro et al. |
| 2004/0220965 A1 | 11/2004 | Harville et al. |
| 2004/0225641 A1 | 11/2004 | Dettinger et al. |
| 2004/0243614 A1 | 12/2004 | Boone et al. |
| 2004/0254919 A1 | 12/2004 | Giuseppini |
| 2005/0015624 A1 | 1/2005 | Ginter et al. |
| 2005/0022207 A1 | 1/2005 | Grabarnik et al. |
| 2005/0108211 A1 | 5/2005 | Karimisetty et al. |
| 2005/0108283 A1 | 5/2005 | Karimisetty et al. |
| 2005/0114707 A1 | 5/2005 | DeStefano et al. |
| 2005/0160086 A1 | 7/2005 | Haraguchi et al. |
| 2005/0172162 A1 | 8/2005 | Takahashi et al. |
| 2005/0203876 A1 | 9/2005 | Cragun et al. |
| 2005/0023535 A1 | 10/2005 | Wang |
| 2006/0053174 A1 | 3/2006 | Gardner et al. |
| 2006/0074621 A1 | 4/2006 | Rachman |
| 2006/0011212 A1 | 5/2006 | Clark et al. |
| 2006/0129554 A1 | 6/2006 | Suyama et al. |
| 2006/0143159 A1 | 6/2006 | Chowdhury et al. |
| 2006/0017391 A1 | 8/2006 | Kalmick et al. |
| 2006/0190804 A1 | 8/2006 | Yang |
| 2006/0225001 A1 | 10/2006 | Sylthe et al. |
| 2006/0026539 A1 | 11/2006 | Bryan et al. |
| 2006/0253423 A1 | 11/2006 | McLane et al. |
| 2006/0253790 A1 | 11/2006 | Ramarajan et al. |
| 2006/0271520 A1 | 11/2006 | Ragan |
| 2006/0277482 A1 | 12/2006 | Hoffman et al. |
| 2006/0293979 A1 | 12/2006 | Cash et al. |
| 2007/0043703 A1 | 2/2007 | Bhattacharya et al. |
| 2007/0061735 A1 | 3/2007 | Hoffberg et al. |
| 2007/0061751 A1 | 3/2007 | Cory et al. |
| 2007/0100834 A1 | 5/2007 | Landry et al. |
| 2007/0118491 A1 | 5/2007 | Baum et al. |
| 2007/0198565 A1* | 8/2007 | Ivanov .................. G06F 40/169 |
| | | 707/999.102 |
| 2007/0209080 A1 | 9/2007 | Ture et al. |
| 2007/0214134 A1 | 9/2007 | Haselden et al. |
| 2007/0214164 A1 | 9/2007 | MacLennan et al. |
| 2007/0023969 A1 | 10/2007 | Singh et al. |
| 2008/0021748 A1 | 1/2008 | Bay et al. |
| 2008/0097789 A1 | 4/2008 | Huffer |
| 2008/0104046 A1* | 5/2008 | Singla ................ H04L 63/1408 |
| 2008/0104542 A1 | 5/2008 | Cohen et al. |
| 2008/0134071 A1 | 6/2008 | Keohane et al. |
| 2008/0177689 A1 | 7/2008 | Jeng et al. |
| 2008/0208820 A1 | 8/2008 | Usey et al. |
| 2008/0215546 A1 | 9/2008 | Baum et al. |
| 2008/0222125 A1 | 9/2008 | Chowdhury |
| 2008/0235277 A1 | 9/2008 | Mathew et al. |
| 2008/0249858 A1 | 10/2008 | Angell et al. |
| 2008/0270366 A1 | 10/2008 | Frank |
| 2008/0291030 A1 | 11/2008 | Pape et al. |
| 2008/0294740 A1 | 11/2008 | Grabarnik et al. |
| 2008/0030109 A1 | 12/2008 | Zhu et al. |
| 2008/0030698 A1 | 12/2008 | Brunner et al. |
| 2008/0032003 A1 | 12/2008 | Koistinen et al. |
| 2009/0055523 A1 | 2/2009 | Song et al. |
| 2009/0009420 A1 | 4/2009 | Marvit et al. |
| 2009/0125916 A1 | 5/2009 | Lu et al. |
| 2009/0017768 A1 | 7/2009 | Song et al. |
| 2009/0198640 A1 | 8/2009 | To |
| 2009/0216867 A1 | 8/2009 | Pusateri et al. |
| 2009/0265424 A1 | 10/2009 | Kimoto et al. |
| 2009/0028768 A1 | 11/2009 | Paek et al. |
| 2009/0300065 A1 | 12/2009 | Birchall |
| 2009/0319512 A1 | 12/2009 | Baker et al. |
| 2009/0319941 A1 | 12/2009 | Laansoo et al. |
| 2009/0327319 A1 | 12/2009 | Bertram et al. |
| 2010/0015211 A1 | 1/2010 | Barnett et al. |
| 2010/0017390 A1 | 1/2010 | Yamasaki et al. |
| 2010/0057660 A1 | 3/2010 | Kato |
| 2010/0010674 A1 | 4/2010 | Brunner et al. |
| 2010/0095018 A1 | 4/2010 | Khemani et al. |
| 2010/0013837 A1 | 6/2010 | Wright et al. |
| 2010/0022349 A1 | 9/2010 | Panigrahy et al. |
| 2010/0229096 A1 | 9/2010 | Maiocco et al. |
| 2010/0250236 A1 | 9/2010 | Jagannathan et al. |
| 2010/0250497 A1 | 9/2010 | Redlich et al. |
| 2010/0251100 A1 | 9/2010 | Delacourt |
| 2010/0275128 A1 | 10/2010 | Ward et al. |
| 2010/0306281 A1 | 12/2010 | Williamson |
| 2010/0333008 A1 | 12/2010 | Taylor |
| 2011/0004072 A1 | 2/2011 | Dircz |
| 2011/0029817 A1 | 2/2011 | Nakagawa et al. |
| 2011/0035345 A1 | 2/2011 | Duan et al. |
| 2011/0066585 A1 | 3/2011 | Subrahmanyam et al. |
| 2011/0066632 A1 | 3/2011 | Robson et al. |
| 2011/0119219 A1 | 5/2011 | Naifeh et al. |
| 2011/0137836 A1 | 6/2011 | Kuriyama et al. |
| 2011/0153646 A1 | 6/2011 | Hong et al. |
| 2011/0021903 A1 | 9/2011 | Korsunsky et al. |
| 2011/0023122 A1 | 9/2011 | Winters |
| 2011/0246528 A1 | 10/2011 | Hsieh et al. |
| 2011/0246644 A1 | 10/2011 | Hamada |
| 2011/0027669 A1 | 11/2011 | Maldaner |
| 2011/0270877 A1 | 11/2011 | Kim |
| 2011/0032045 A1 | 12/2011 | Li et al. |
| 2011/0295871 A1 | 12/2011 | Folting et al. |
| 2011/0313844 A1 | 12/2011 | Chandramouli et al. |
| 2011/0314148 A1* | 12/2011 | Petersen ............. H04L 63/1408 |
| | | 709/224 |
| 2012/0023429 A1 | 1/2012 | Medhi |
| 2012/0054675 A1 | 3/2012 | Rajamannar et al. |
| 2012/0079363 A1 | 3/2012 | Folting et al. |
| 2012/0094694 A1 | 4/2012 | Malkin et al. |
| 2012/0101975 A1 | 4/2012 | Khosravy |
| 2012/0011707 A1 | 5/2012 | Baum et al. |
| 2012/0131185 A1 | 5/2012 | Petersen et al. |

(56) References Cited

U.S. PATENT DOCUMENTS

| | | |
|---|---|---|
| 2012/0137367 A1 | 5/2012 | Dupont et al. |
| 2012/0022155 A1 | 8/2012 | Kidron |
| 2012/0221553 A1 | 8/2012 | Wittmer et al. |
| 2012/0221580 A1 | 8/2012 | Barney |
| 2012/0022677 A1 | 9/2012 | Crucs |
| 2012/0227004 A1 | 9/2012 | Madireddi et al. |
| 2012/0246303 A1 | 9/2012 | Petersen et al. |
| 2012/0283948 A1 | 11/2012 | Demiryurek et al. |
| 2012/0296876 A1 | 11/2012 | Bacinschi et al. |
| 2012/0324329 A1 | 12/2012 | Ceponkus et al. |
| 2012/0324359 A1 | 12/2012 | Lee et al. |
| 2013/0001901 A1 | 1/2013 | Lam |
| 2013/0007645 A1 | 1/2013 | Kumniawan et al. |
| 2013/0008064 A1 | 1/2013 | Park |
| 2013/0005466 A1 | 2/2013 | Zhang |
| 2013/0035961 A1 | 2/2013 | Yegnanarayanan |
| 2013/0041824 A1 | 2/2013 | Gupta |
| 2013/0054642 A1 | 2/2013 | Morin |
| 2013/0006093 A1 | 3/2013 | Bath et al. |
| 2013/0007354 A1 | 3/2013 | Zhang et al. |
| 2013/0060912 A1 | 3/2013 | Rensin et al. |
| 2013/0073573 A1 | 3/2013 | Huang et al. |
| 2013/0073957 A1 | 3/2013 | DiGiantomasso et al. |
| 2013/0080190 A1 | 3/2013 | Mansour et al. |
| 2013/0103409 A1 | 4/2013 | Malkin et al. |
| 2013/0144863 A1 | 6/2013 | Mayer et al. |
| 2013/0017332 A1 | 7/2013 | Gray |
| 2013/0018270 A1 | 7/2013 | Figura et al. |
| 2013/0185643 A1 | 7/2013 | Greifeneder et al. |
| 2013/0205014 A1 | 8/2013 | Muro et al. |
| 2013/0232094 A1 | 9/2013 | Anderson et al. |
| 2013/0238631 A1 | 9/2013 | Carmel et al. |
| 2013/0262371 A1 | 10/2013 | Nolan |
| 2013/0318236 A1 | 11/2013 | Coates et al. |
| 2014/0019909 A1 | 1/2014 | Leonard et al. |
| 2014/0046976 A1 | 2/2014 | Zhang et al. |
| 2014/0082513 A1* | 3/2014 | Mills ............... H04L 41/22 715/744 |
| 2014/0129942 A1 | 5/2014 | Rathod |
| 2014/0160238 A1 | 6/2014 | Yim et al. |
| 2014/0324862 A1 | 10/2014 | Bingham et al. |
| 2015/0019537 A1 | 1/2015 | Neels et al. |
| 2015/0058318 A1 | 2/2015 | Blackwell et al. |
| 2015/0109305 A1 | 4/2015 | Black |
| 2015/0142725 A1 | 5/2015 | Candea et al. |
| 2015/0143220 A1* | 5/2015 | Carasso ............. G06F 16/2477 715/226 |
| 2015/0213631 A1 | 7/2015 | Vander Broek |
| 2015/0222604 A1 | 8/2015 | Ylonen |
| 2015/0278153 A1* | 10/2015 | Leonard ............ G06F 17/18 702/178 |
| 2015/0278214 A1 | 10/2015 | Anand et al. |
| 2015/0294256 A1 | 10/2015 | Mahesh et al. |
| 2015/0341212 A1 | 11/2015 | Hsiao et al. |
| 2016/0092045 A1 | 3/2016 | Lamas et al. |
| 2016/0224531 A1 | 8/2016 | Robichaud et al. |
| 2016/0224614 A1 | 8/2016 | Robichaud et al. |
| 2016/0224618 A1 | 8/2016 | Robichaud et al. |
| 2016/0224619 A1 | 8/2016 | Robichaud et al. |
| 2016/0224624 A1 | 8/2016 | Robichaud |
| 2016/0224643 A1 | 8/2016 | Robichaud |
| 2016/0224659 A1 | 8/2016 | Robichaud |
| 2016/0224804 A1 | 8/2016 | Carasso |
| 2016/0350950 A1 | 12/2016 | Ritchie et al. |
| 2017/0011229 A1 | 1/2017 | Jones-McFadden et al. |
| 2017/0139996 A1 | 5/2017 | Marquardt et al. |
| 2017/0286038 A1 | 10/2017 | Li et al. |
| 2017/0286455 A1 | 10/2017 | Li et al. |
| 2017/0286525 A1 | 10/2017 | Li et al. |
| 2017/0322959 A1 | 11/2017 | Tidwell et al. |
| 2018/0032706 A1 | 2/2018 | Fox et al. |
| 2018/0089303 A1 | 3/2018 | Miller et al. |
| 2018/0089561 A1 | 3/2018 | Oliner et al. |
| 2018/0314853 A1 | 11/2018 | Oliner et al. |
| 2019/0098106 A1 | 3/2019 | Mungel et al. |
| 2019/0146978 A1 | 5/2019 | Beedgen et al. |
| 2019/0268354 A1 | 8/2019 | Zettel, II et al. |
| 2020/0125725 A1 | 4/2020 | Petersen et al. |
| 2020/0135337 A1 | 4/2020 | Athey et al. |
| 2020/0143054 A1 | 5/2020 | Cohen et al. |
| 2020/0336505 A1 | 10/2020 | Neuvirth et al. |
| 2021/0117232 A1 | 4/2021 | Sriharsha et al. |
| 2021/0117425 A1 | 4/2021 | Rao et al. |
| 2021/0117868 A1 | 4/2021 | Sriharsha |
| 2021/0133634 A1 | 5/2021 | Ma et al. |
| 2021/0374112 A1 | 12/2021 | Nagai et al. |
| 2022/0121708 A1 | 4/2022 | Burnett et al. |
| 2022/0208339 A1 | 6/2022 | Neumann |
| 2022/0269727 A1 | 8/2022 | Batsakis et al. |

OTHER PUBLICATIONS

Aho, A.V., et al., "Columbia digital news project: an environment for briefing and search over multimedia information," International Journal on Digital Libraries, vol. 1, No. 4, pp. 1-2 (Mar. 1998).

Carasso, D.,"Exploring Splunk: Search Processing Language (SPL) Primer and Coockbook," Splunk, pp. 156 (Apr. 2012).

Carasso, D., "Field Extractor App (Walkthrough)," [online video excerpts], YouTube, Jul. 12, 2013, Retrieved from the Internet: <https://www.youtube.com/walch?v=Gfl9Cm9v64Y> on Jun. 17, 2014, last accessed on May 19, 2015, pp. 2.

Carasso, D., "Semi-Automatic Discovery of Extraction Patterns for Log Analysis," Splunk Inc., pp. 3 (2007).

Ennis, Mark; "Headache relief for programmers:: regular expression generator," Aug. 13, 2007, http://txt2re.com/, accessed on Jan. 15, 2016, p. 1.

"ITunes 10 for Mac: Create a Smart Playlist", Apple, Nov. 27, 2012, accessed at http://support.apple.com/kb/PH1739?viewlocale=en_US, accessed on Feb. 18, 2013, p. 1.

Patel, D., et al., "An evaluation of techniques for image searching and browsing on mobile devices," Published in: Proceeding SAICSIT '09 Proceedings of the 2009 Annual Research Conference of the South African Institute of Computer Scientists and Information Technologies, pp. 1-2 (Oct. 2009).

Tong, H.H., et al., "Fast mining of complex time-stamped events," Proceeding CIKM '08 Proceedings of the 17th ACM conference on Information and knowledge management, pp. 759-767 (Oct. 26-30, 2008).

Kalmanek, C.R., et al., "Darkstar: Using exploratory data mining to raise the bar on network reliability and performance," 2009 7th International Workshop on Design of Reliable Communication Networks, pp. 1-10 (2009).

Wang, M., et al., "Event Indexing and Searching for High Volumes of Event Streams in the Cloud," 2012 IEEE 36th Annual Date of Conference Published in Computer Software and Applications Conference (COMPSAC), pp. 1-3 (Jul. 16-20, 2012).

"RegexBuddy Demo-Self-Running Demonstration," RegexBuddy.com, Oct. 28, 2012, accessed at http://www.regexbuddy.com/democreate.html, accessed on Feb. 18, 2013, pp. 2.

Riloff, E., et al., "Learning Dictionaries for information Extraction by Multi-Level Bootstrapping," Proceedings of the Sixteenth National Conference on Artificial Intelligence, pp. 6 (Jul. 1999).

Soderland, S., et al., "Issues in Inductive Learning of Domain-Specific Text Extraction Rules," Proceedings of the Workshop on New Approaches to Learning for Natural language Processing at the Fourteenth International Joint Conference on Artificial Intelligence, pp. 1-4 (Aug. 1995).

Splunk, Splunk User Manual Version 4.1, pp. 181 (Year: 2011).

txt2re.com Google Search, hllps://www.google.com/search?q=txt2re.com&biw= 1536&bih=824&source=Int&tbs=cdr . . . , accessed on Jan. 19, 2016, pp. 2.

U.S. Appl. No. 13/748,313, filed Jan. 23, 2013, Granted.
U.S. Appl. No. 14/611,093, filed Jan. 30, 2015, Abandoned.
U.S. Appl. No. 14/169,268, filed Jan. 31, 2014, Abandoned.
U.S. Appl. No. 15/582,671, filed Apr. 29, 2017, Granted.
U.S. Appl. No. 15/582,670, filed Apr. 29, 2017, Granted.
U.S. Appl. No. 17/028,722, filed Sep. 22, 2020, Pending.
U.S. Appl. No. 14/610,668, filed Jan. 30, 2015, Granted.

(56) References Cited

OTHER PUBLICATIONS

U.S. Appl. No. 14/611,089, filed Jan. 30, 2015, Granted.
U.S. Appl. No. 15/417,430, filed Jan. 27, 2017, Granted.
U.S. Appl. No. 13/747,177, filed Jan. 22, 2013, Abandoned.
U.S. Appl. No. 15/582,599, filed Apr. 28, 2017, Granted.
U.S. Appl. No. 15/694,654, filed Sep. 1, 2017, Granted.
U.S. Appl. No. 16/394,754, filed Apr. 25, 2019, Granted.
U.S. Appl. No. 16/541,637, filed Aug. 15, 2019, Granted.
U.S. Appl. No. 16/589,445, filed Oct. 1, 2019, Granted.
U.S. Appl. No. 16/003,998, filed Jun. 8, 2018, Granted.
U.S. Appl. No. 17/028,755, filed Sep. 22, 2020, Granted.
U.S. Appl. No. 14/266,839, filed May 1, 2014, Granted.
U.S. Appl. No. 13/748,391, filed Jan. 23, 2013, Granted.
U.S. Appl. No. 13/607,117, filed Sep. 7, 2012, Granted.
U.S. Appl. No. 14/067,203, filed Oct. 30, 2013, Granted.
U.S. Appl. No. 13/747,153, filed Jan. 22, 2013, Granted.
U.S. Appl. No. 14/168,888, filed Jan. 30, 2014, Granted.
U.S. Appl. No. 13/748,360, filed Jan. 23, 2013, Granted.
U.S. Appl. No. 14/816,036, filed Aug. 2, 2015, Granted.
U.S. Appl. No. 14/816,038, filed Aug. 2, 2015, Granted.
U.S. Appl. No. 15/011,392, filed Jan. 29, 2016, Abandoned.
U.S. Appl. No. 15/582,667, filed Apr. 29, 2017, Granted.
U.S. Appl. No. 15/582,668, filed Apr. 29, 2017, Granted.
U.S. Appl. No. 15/582,669, filed Apr. 29, 2017, Pending.
U.S. Appl. No. 17/169,254, filed Feb. 5, 2021, Pending.
U.S. Appl. No. 17/443,892, filed Jul. 28, 2021, Pending.
U.S. Appl. No. 17/384,467, filed Jul. 23, 2021, Pending.

\* cited by examiner

Extract Fields
Specify your data source, then highlight the text you would like to extract.

Specify your data source
Sourcetype [ ▲▼ ]    syslog [ ▲▼ ]

Extraction Rule Preview
When you select text, we will give you a preview of the extraction rule you have created. Or you can manually enter and/or edit an extraction rule by clicking the button below.

( Create extraction rule )

☐ Dim fields that are already extracted.

Filter: [          ]    Show: All [ ▲▼ ]    Result type: Latest [ ▲▼ ]

( Save this extraction )

| Timestamp | Event Records |
|---|---|
| 2012-12-17 10:35:38-0800 | Dec 17 10:35:38 ronnie nslcd[23629]: [408750] passwd entry uid-colwilliams.cn=users,dc=osx,dc=splat,dc=coms contains too large uidNumber value |
| 2012-12-17 10:35:38-0800 | Dec 17 10:35:38 ronnie nslcd[23629]: [408750] passwd entry uid-mpideon.cn=users,dc=osx,dc=splat,dc=coms contains too large uidNumber value |
| 2012-12-17 10:58:59-0800 | Dec 17 10:58:59 ronnie sshd[23362]: subsystem request for sftp |
| ... | |

Extracted values

*To begin, highlight an example value from the events to the left*

FIG. 8A

Extract Fields

Specify your data source, then highlight the text you would like to extract.

Specify your data source

Sourcetype: syslog

Extraction Rule Preview

812 `[^\]\s*\s*(?P<FIELDNAME>\w+)`

FIELDNAME — 814

☐ Dim fields that are already extracted.

Filter: [ ]   Show: All   Result type: Latest

Save this extraction

| Timestamp | Event Records |
|---|---|
| 2012-12-17 10:35:38-0800 | Dec 17 10:35:38 ronnie nslcd[23629]: [40/750] passwd entry uid-colwilliams.cn=users.dc=osx.dc=splat.dc=coms contains too large uidNumber value — 822  824 |
| 2012-12-17 10:35:38-0800 | Dec 17 10:35:38 ronnie nslcd[23629]: [40/750] passwd entry uid-mpideon.cn=users.dc=osx.dc=splat.dc=coms contains too large uidNumber value |
| 2012-12-17 10:58:59-0800 | Dec 17 10:58:59 ronnie sshd[23362]: Subsystem request for sftp |

Extracted values — 816

- *Passwd* — 818 — 40%
- *subsystem* — 10%
- *logfile* — 2%

FIG. 8B

Extract Fields

Specify your data source, then highlight the text you would like to extract.

Specify your data source

Sourcetype [▲▼]  syslog [▲▼]

Field name

FIELDNAME

Extraction Rule Preview

`[^\|\n*\|\s+(?P<FIELDNAME>\w+)`

☐ Dim fields that are already extracted.

Filter: [         ]  Show: All [▲▼]  Result type: Latest [▲▼]

(Save this extraction)

| Timestamp | Event Records |
|---|---|
| 2012-12-17 10:58:59-0800 | Dec 17 10:58:59 ronnie sshd[23362]: subsystem request for sftp |
| ... | |

— 808

Extracted values

✗ *subsystem* — 820

AUTOMATED EXTRACTION RULE MODIFICATION BASED ON REJECTED FIELD VALUES

CROSS-REFERENCE TO RELATED APPLICATIONS

This application is a Continuation of U.S. patent application Ser. No. 15/582,669, filed Apr. 29, 2017, which is itself a Continuation of U.S. patent application Ser. No. 15/011,392, filed Jan. 29, 2016, which is itself a Continuation of U.S. patent application Ser. No. 14/816,038, filed Aug. 2, 2015, now issued as U.S. Pat. No. 10,282,463, which is itself a Continuation of U.S. patent application Ser. No. 13/748,360, filed Jan. 23, 2013, now issued as U.S. Pat. No. 9,152,929, the entire contents of each of the foregoing applications are incorporated by reference herein.

BACKGROUND OF THE INVENTION

The rapid increase in the production and collection of machine-generated data has created large data sets that are difficult to search and/or otherwise analyze. The machine data can include sequences of time stamped records that may occur in one or more usually continuous streams. Further, machine data often represents activity made up of discrete records or events.

Often, search engines may receive data from various data sources, including machine data. In some cases, this data may be analyzed or processed in a variety of ways. However, prior to such processing, field values may need to be extracted from the received data. Sometimes the received data may be unstructured, which may make it difficult for systems to efficiently analyze the received data to determine what data may be of interest and/or how to generate a field value extraction rule. This may be especially true where the datasets are considered extremely large, such as terabytes or greater. Such large unstructured datasets may make it difficult and time consuming to analyze the data so as to be able to perform various actions on the data. For example, determining extraction rules, modification rules, or the like on such large datasets that are correct and effective may be difficult and time consuming. Improper and/or ineffective rules may result in improper value from the received data and/or omit significant values. Thus, it is with respect to these considerations and others that the present invention has been made.

BRIEF DESCRIPTION OF THE SEVERAL VIEWS OF THE DRAWING

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein:

FIG. 8A illustrates non-exhaustive examples of a use case of embodiments of a graphical user interface that may be employed to enable a user to create extraction rule and to obtain real time display of extracted values;

FIG. 8B illustrates non-exhaustive examples of a use case of embodiments of a graphical user interface that may be employed to enable a user to create extraction rule and to obtain real time display of extracted values;

FIG. 8C illustrates non-exhaustive examples of a use case of embodiments of a graphical user interface that may be employed to enable a user to create extraction rule and to obtain real time display of extracted values;

DETAILED DESCRIPTION OF THE INVENTION

Figure 1:
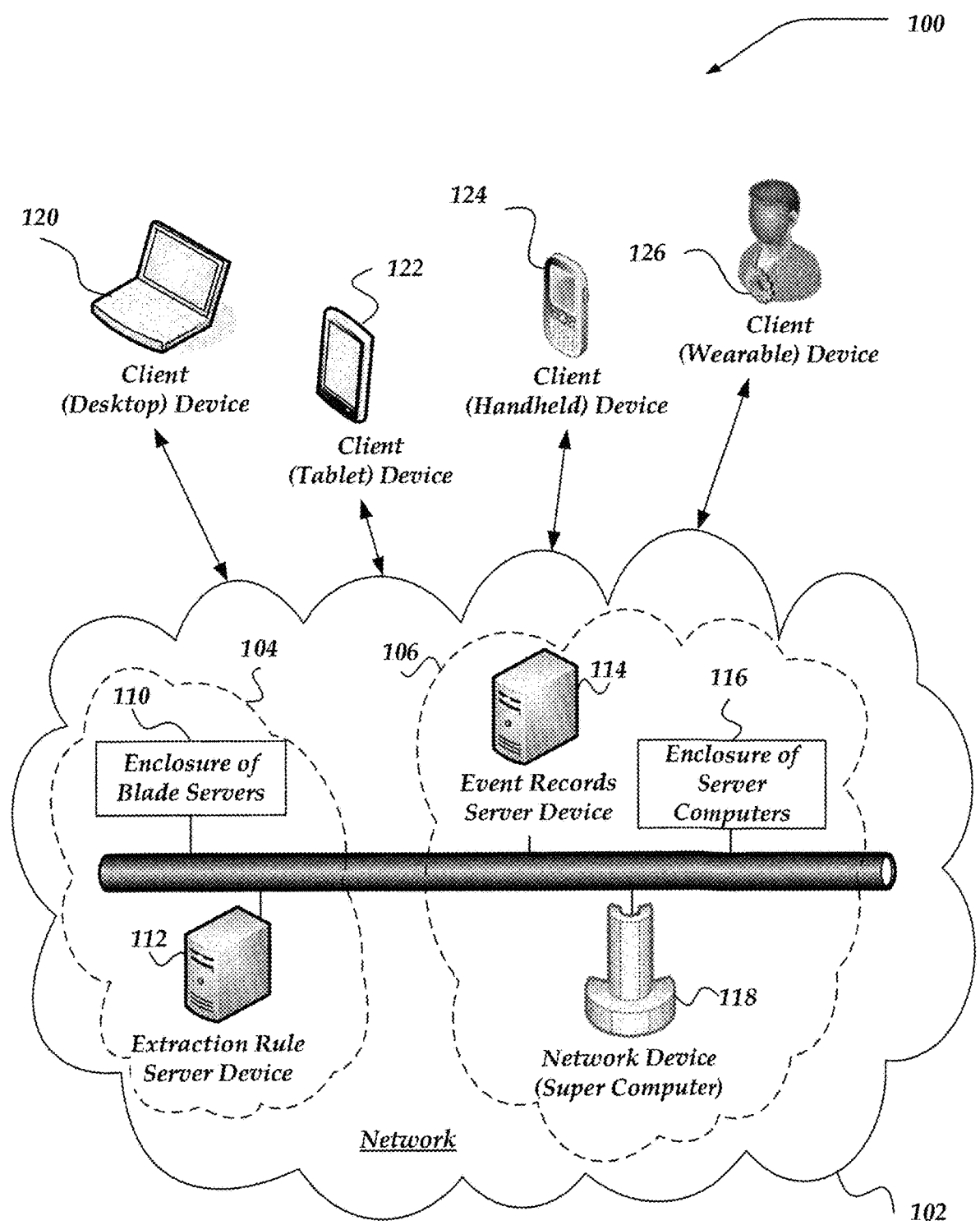
FIG. 1 illustrates a system environment in which various embodiments may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

The term "machine data" as used herein may include data generated by machines, including, but not limited to, server logs or other types of event data and/or records. In at least one of various embodiments, machine data streams may be time stamped to create time stamped events. For example, information processing environments, such as, firewalls, routers, web servers, application servers and databases may generate streams of time series data in the form of events. In some cases, events may be generated hundreds or thousands of times per second. In some embodiments, the machine data may be unstructured data, structured data, and/or a combination thereof. Unstructured data may refer to data that does not include at least one predefined field.

The term "extraction rule" and/or "data field extraction rule" may refer to instructions that may be applied to identify and extract field values from data, such as event records. In some embodiments, extraction rule may define a field within event records from which to extract a value. In at least one of various embodiments, the extraction rules may include regular expressions. The data from which extraction rules may be applied may include structured and/or unstructured machine data, or other type of data.

As used herein, the term "event record" may refer to computing data that is collected about an event for a computing system, including, for example, an action, characteristic, condition (or state) of the computing system. For example, such events may be about a computing system's performance, actions taken by the computing system, or the like. Event records may be obtained from various computing log files generated by the computer's operating system, and/or other monitoring application. However, event records are not restricted by a file format or structure from which the event data is obtained. In various embodiments, event records may include structured and/or unstructured machine data, and/or a combination thereof.

The term "regular expression" as used herein may refer to a sequence of constants and operators arranged into expressions for matching a set of strings. A regular expression is often defined as a pattern matching language which can be employed to identify character strings, for example, to select specific strings from a set of character strings. More particularly, regular expressions are often defined as a context-independent syntax that can represent a wide variety of character sets and character set orderings. In operation, regular expressions can be employed to search data based upon a predefined pattern or set of patterns. As such, this pattern matching language employs a specific syntax by which particular characters or strings are selected from a body of text. Although simple examples of regular expressions can be easily understood, oftentimes, the syntax of regular expressions are so complex that even the most experienced programmers have difficulty in understanding them. Regular expressions may be constructed using a variety of computer languages and constructs. In addition to matching, some regular expression systems offer functionality, such as, substitution, grouping, back references, or the like. Regular expressions and regular expression systems may be adapted to work with non-string data providing matching facilities for binary data.

The following briefly describes embodiments in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards real time display of event records and extracted values based on at least one extraction rule. In at least one embodiment, a user interface may be employed to enable a user to have an extraction rule automatically generate and/or to manually enter an extraction rule. In at least one embodiment, the extraction rule may include a regular expression. In other embodiments, the user may be enabled to manually edit a previously provided extraction rule, which may result in real time display of updated extracted values as the user is editing the extraction rule. The extraction rule may be utilized to extract values from each of a plurality of records, including event records of unstructured machine data. In some other embodiments, statistics, such as a percentage may be determined for each unique extracted value, and may be displayed to the user in real time. Real time display of the extracted values, statistics, and event records may occur as an extraction rule is being manipulated and/or edited by the user. In some embodiments, the user interface may enable the user to select at least one unique extracted value to display those event records that include an extracted value that matches the selected value.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include extraction rule server device 112, event records server device 114, enclosure of blade servers 110, enclosure of server computers 116, super computer network device 118, and the like. Although not shown, one or more client devices may be included in cloud network 102 in one or more arrangements to provide one or more network services to a user. Also, these arrangements of networked computing devices may or may not be mutually exclusive of each other.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, wearable client device 126, desktop client device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a client device is described in more detail below in conjunction with FIG. 3. Generally, client devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs), Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), 5th (5G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, and the like.

One embodiment of extraction rule server device 112 is described in more detail below in conjunction with FIG. 4. Briefly, however, extraction rule server device 112 includes virtually any network device capable of generating and/or managing extraction rules. In some embodiments, extraction rule server device 112 may automatically generate extraction rules. Devices that may be arranged to operate as extraction rule server device 112 include various network devices, including, but not limited to personal computers, desktop computers, multiprocessor systems, microprocessor-based or programmable consumer electronics, network PCs, server devices, network appliances, and the like.

Although FIG. 1 illustrates extraction rule server device 112 as a single computing device, the invention is not so limited. For example, one or more functions of the extraction rule server device 112 may be distributed across one or more distinct network devices. Moreover, extraction rule server device 112 is not limited to a particular configuration. Thus, in one embodiment, extraction rule server device 112 may contain a plurality of network devices. In another embodiment, extraction rule server device 112 may contain a plurality of network devices that operate using a master/slave approach, where one of the plurality of network devices of extraction rule server device 112 operates to manage and/or otherwise coordinate operations of the other network devices. In other embodiments, the extraction rule server device 112 may operate as a plurality of network devices within a cluster architecture, a peer-to-peer architecture, and/or even within a cloud architecture. Thus, the invention is not to be construed as being limited to a single environment, and other configurations, and architectures are also envisaged.

One embodiment of event records server device 114 is described in more detail below in conjunction with FIG. 4. Briefly, however, event records server device 114 includes virtually any network device capable of collecting and/or maintaining event records. In some embodiments, event records server device 114 may be in communication with extraction rule server device 112 to enable the use of extraction rules on event records. Devices that may be arranged to operate as event records server device 114 include various network devices, including, but not limited to personal computers, desktop computers, multiprocessor systems, microprocessor-based or programmable consumer electronics, network PCs, server devices, network appliances, and the like.

Although FIG. 1 illustrates event records server device 114 as a single computing device, the invention is not so limited. For example, one or more functions of the event records server device 114 may be distributed across one or more distinct network devices. Moreover, event records server device 114 is not limited to a particular configuration.

Thus, in one embodiment, event records server device 114 may contain a plurality of network devices. In another embodiment, event records server device 114 may contain a plurality of network devices that operate using a master/slave approach, where one of the plurality of network devices of event records server device 114 operates to manage and/or otherwise coordinate operations of the other network devices. In other embodiments, the event records server device 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Enclosure of Blade Servers

Figure 2A:
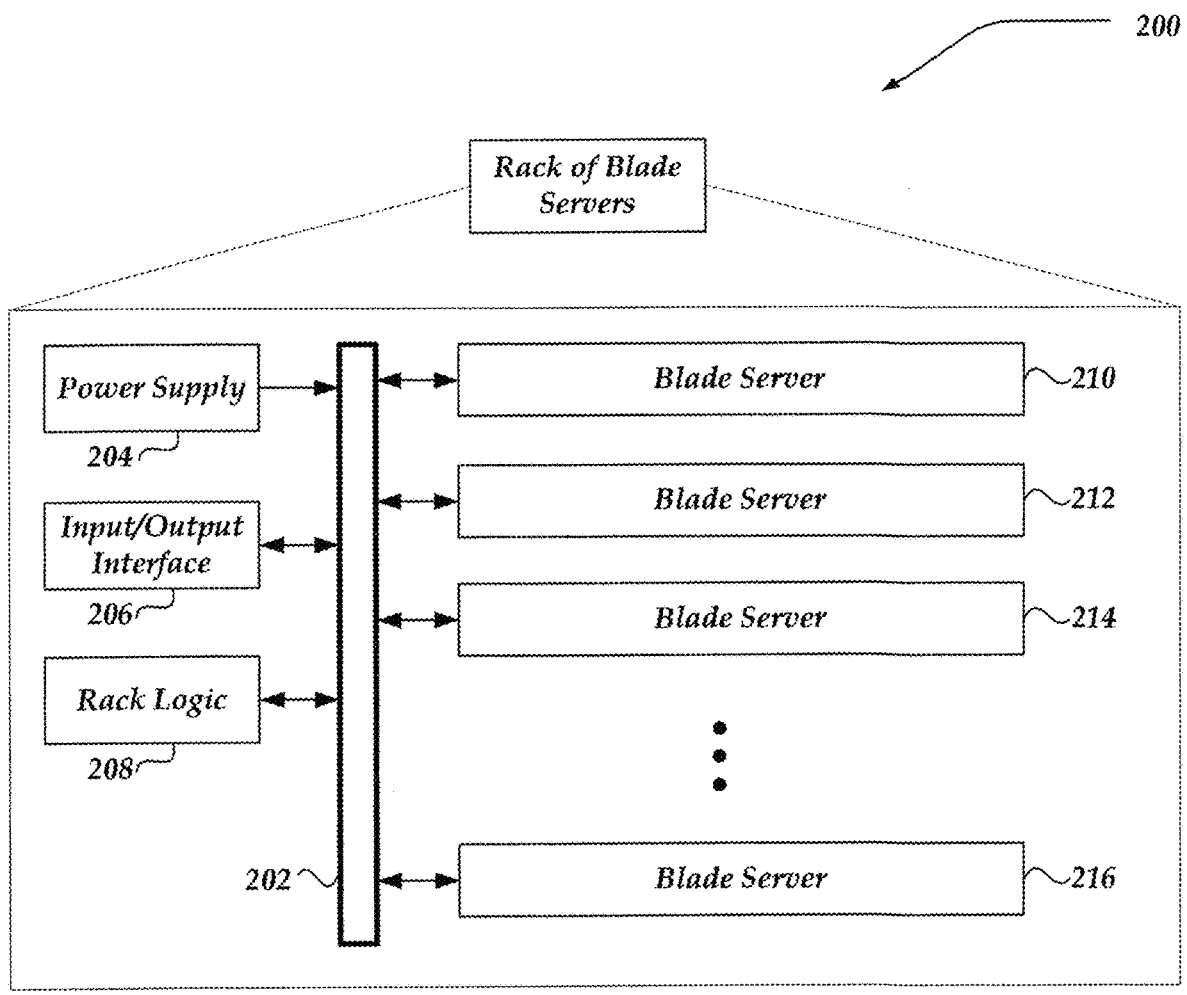
FIG. 2A shows a rack of blade servers that may be included in various embodiments.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the FIG., enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
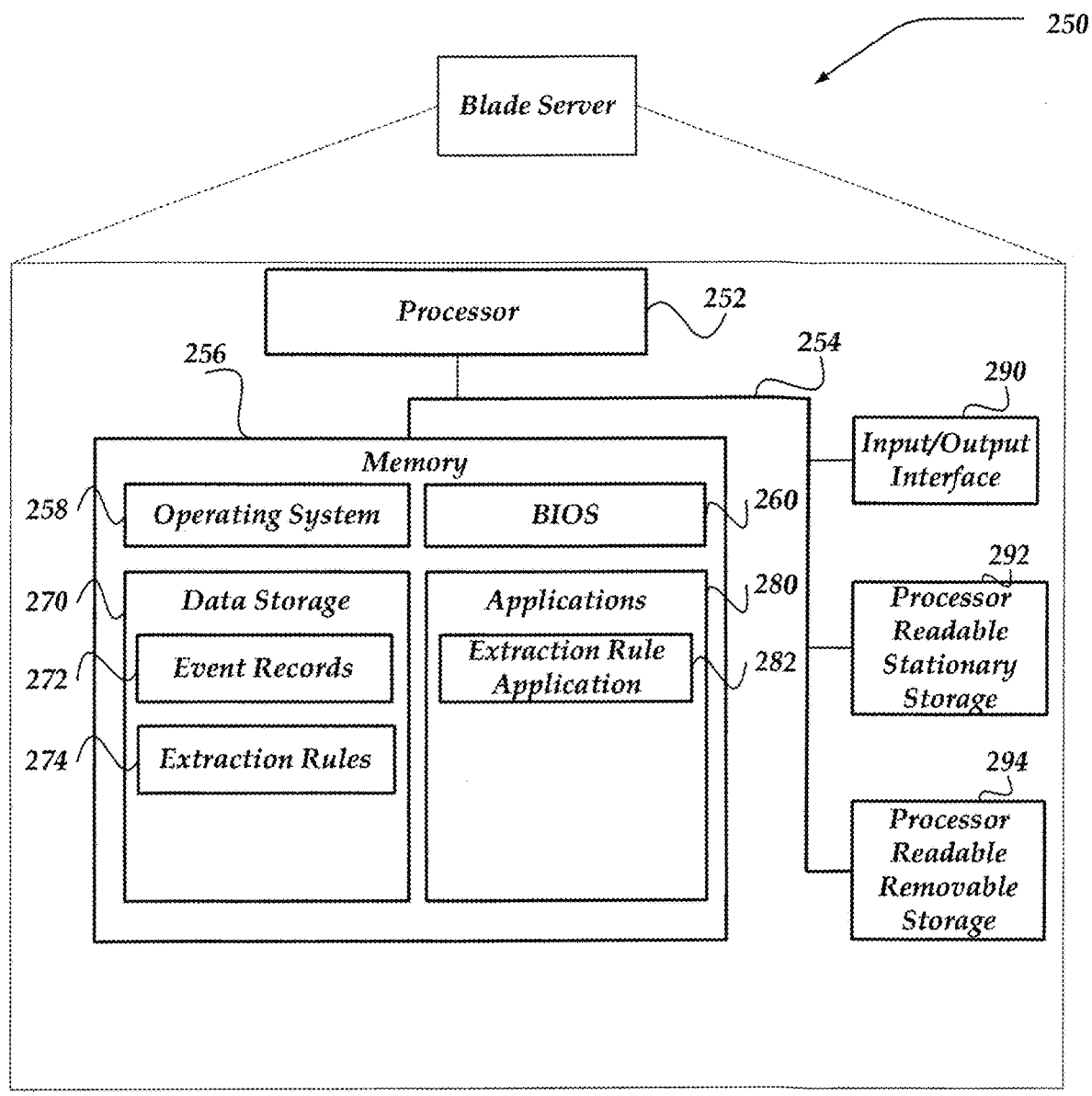
FIG. 2B illustrates an embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 may include processor 252 which communicates with memory 256 via bus 254. Blade server 250 may also include input/output interface 290, processor-readable stationary storage device 292, and processor-readable removable storage device 294. Input/output interface 290 can enable blade server 250 to communicate with other blade servers, client devices, network devices, and the like. Interface 290 may provide wireless and/or wired communication links for blade server. Processor-readable stationary storage device 292 may include devices such as an electromagnetic storage device (hard disk), solid state hard disk (SSD), hybrid of both an SSD and a hard disk, and the like. Also, processor-readable removable storage device 294 enables processor 252 to read non-transitive storage media for storing and accessing processor-readable instructions, modules, data structures, and other forms of data. The non-transitive storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, or LINUX™, or a specialized server operating system such as Microsoft's Windows Server™ and Apple Computer's iOS Server™.

Memory 256 may further include one or more data storage 270, which can be utilized by blade server 250 to store, among other things, applications 280 and/or other data. Data stores 270 may include program code, data, algorithms, and the like, for use by processor 252 to execute and perform actions. In one embodiment, at least some of data store 270 might also be stored on another component of blade server 250, including, but not limited to, processor-readable removable storage device 294, processor-readable stationary storage device 292, or any other processor-readable storage device (not shown). Data storage 270 may include, for example, event records 272 and extraction rules 274.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, extraction rule application 282.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Client Device

Figure 3:
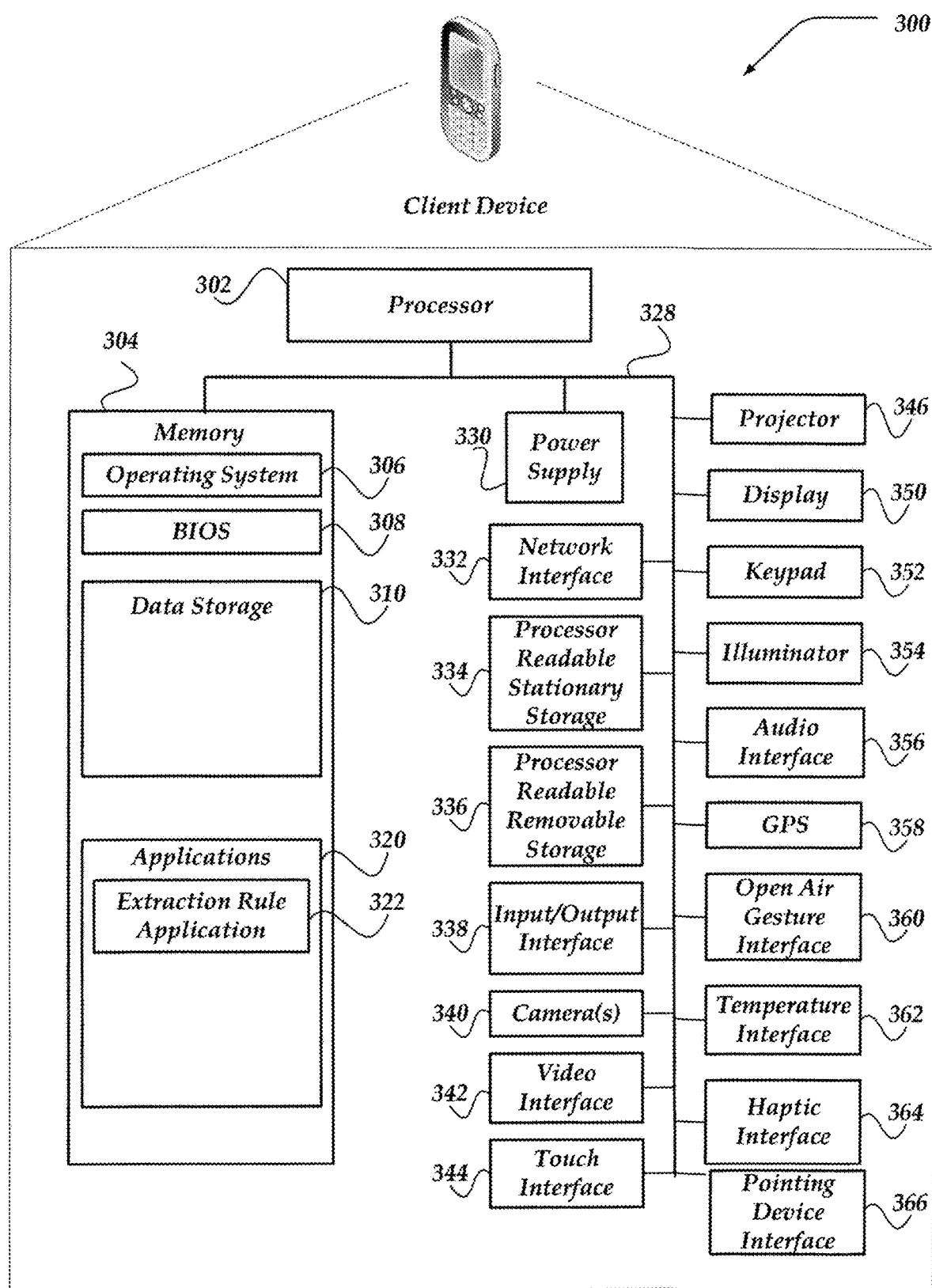
FIG. 3 shows a client device that may be included in various embodiments.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAT), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of client device 300, including, but not limited to, non-transitory processor-readable removable storage device 336, processor-readable stationary storage device 334, or even external to the client device.

Applications 320 may include computer executable instructions which, when executed by client device 300, transmit, receive, and/or otherwise process instructions and data. Applications 320 may include, for example, extraction rule application 322. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Extraction rule application 322 may be configured to enable creation of extraction rules and to display results of the extraction rules to a user. In at least one embodiment, extraction rule application 322 may interact with and/or employed through a web browser. In some embodiments, embodiments, extraction rule application 322 may enable a user to input and/or edit one or more extraction rules. In other embodiments, extraction rule application 322 may display a plurality of event records to a user, values extracted from the event records using the extraction rule, statistics about the extracted values, or the like. In any event, extraction rule application 322 may employ processes, or parts of processes, similar to those described in conjunction with FIGS. 5-7, to perform at least some of its actions.

Illustrative Network Device

Figure 4:
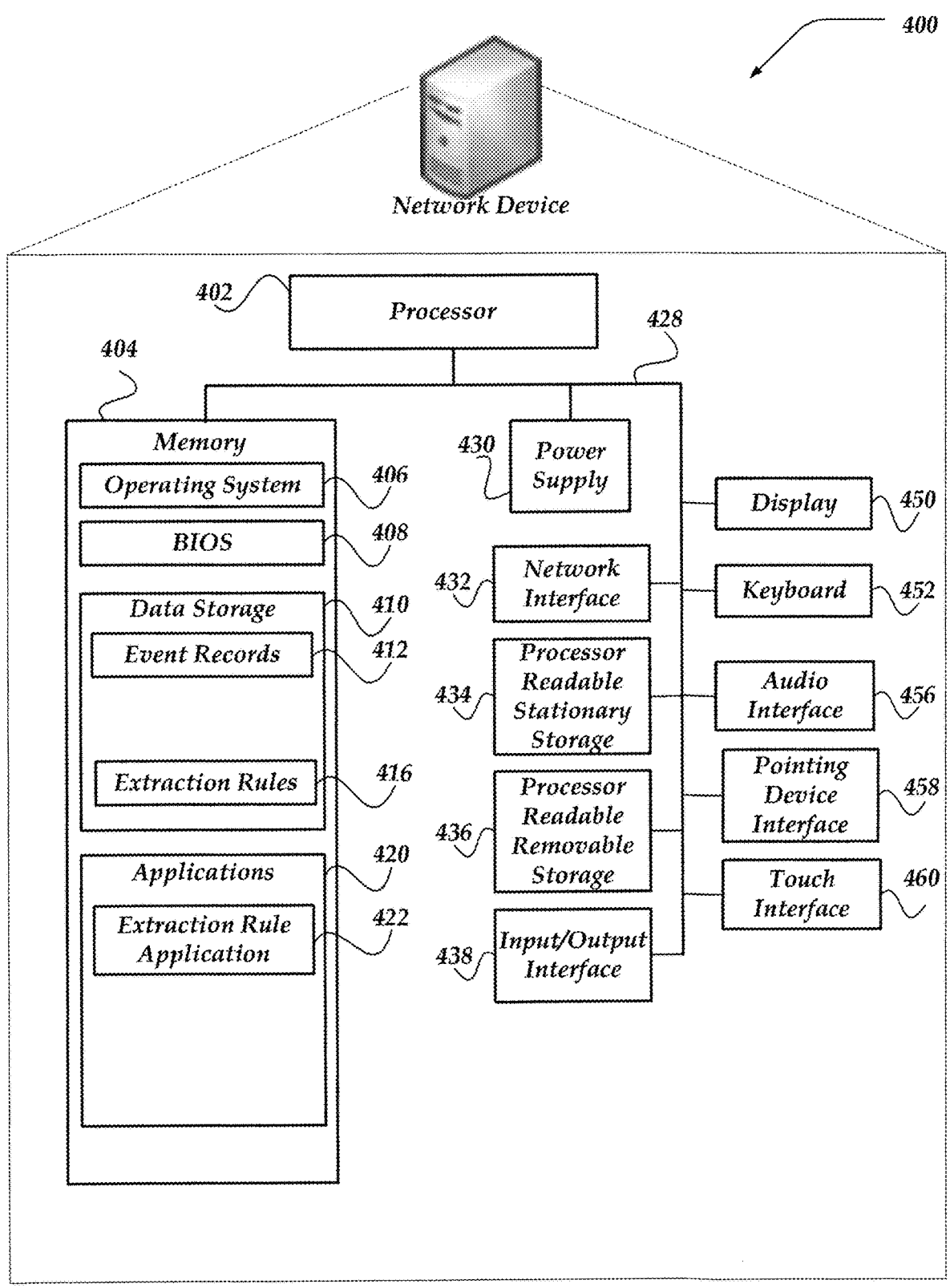
FIG. 4 illustrates a network device that may be included in various embodiments.

FIG. 4 shows one embodiment of network device 400 that may be included in a system implementing the invention. Network device 400 may include many more or less components than those shown in FIG. 4. However, the components shown are sufficient to disclose an illustrative embodiment for practicing the present invention. Network device 400 may represent, for example, one embodiment of at least one of network device 112, 114, or 120 of FIG. 1.

As shown in the FIG., network device 400 may include a processor 402 in communication with a memory 404 via a bus 428. Network device 400 may also include a power supply 430, network interface 432, audio interface 456, display 450, keyboard 452, input/output interface 438, processor-readable stationary storage device 434, processor-readable removable storage device 436, and pointing device interface 458. Power supply 430 provides power to network device 400.

Network interface 432 may include circuitry for coupling network device 400 to one or more networks, and is constructed for use with one or more communication protocols and technologies including, but not limited to, protocols and technologies that implement any portion of the Open Systems Interconnection model (OSI model), GSM, CDMA, time division multiple access (TDMA), UDP, TCP/IP, SMS, MMS, GPRS, WAP, UWB, WiMax, SIP/RTP, or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 also may also comprise input/output interface 438 for communicating with external devices not shown in FIG. 4. Input/output interface 438 can utilize one or more wired or wireless communication technologies, such as USB™, Firewire™ WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components can include any component that allows the computer to take input from, or send output to, a human user of a computer.

Memory 404 may include RAM, ROM, and/or other types of memory. Memory 404 illustrates an example of computer-readable storage media (devices) for storage of information such as computer-readable instructions, data structures, program modules or other data. Memory 404 may store BIOS 408 for controlling low-level operation of network device 400. The memory may also store operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's iOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions. In one embodiment, at least some of data store 410 might also be stored on another component of network device 400, including, but not limited to, non-transitory media inside processor-readable removable storage device 436, processor-readable stationary storage device 434, or any other computer-readable storage device within network device 400, or even external to network device 400.

Data storage 410 may include, for example, event records 412 and extraction rules 416. In some embodiments, event records 412 may store data, including a plurality of event records. In at least one of various embodiments, event records 412 may be stored by event records server device 114 of FIG. 1. Extraction rules 416 may include one or more extractions rules. These extraction rules may be automatically created based on a user selection of text, input by a user, and/or otherwise provided to the system. In at least one embodiment, extraction rules 416 may be stored and/or otherwise processed by extraction rule server device 112 of FIG. 1.

Applications 420 may include computer executable instructions which, when executed by network device 400, transmit, receive, and/or otherwise process messages (e.g., SMS, MMS, Instant Message (IM), email, and/or other messages), audio, video, and enable telecommunication with another user of another client device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include, for example, extraction rule application 422.

Extraction rule application 422 may be configured to enable creation of extraction rules and to display results of the extraction rules to a user. In at least one embodiment, extraction rule application 422 may interact with a client device for enabling a user to input and/or edit one or more extraction rules. In other embodiments, extraction rule application 422 may enable a client device to display a plurality of event records to a user, values extracted from the event records using the extraction rule, statistics about the extracted values, or the like. In at least one embodiment, extraction rule application 422 may interact with event records 412 and/or extraction rules 416 to access and/or store event records and/or extraction rules, respectively. In some embodiments, extraction rule application 422 may be employed by extraction rule server device 112 of FIG. 1. In any event, extraction rule application 422 may employ processes, or parts of processes, similar to those described in conjunction with FIGS. 5 through 7, to perform at least some of its actions.

General Operation

Figure 5:
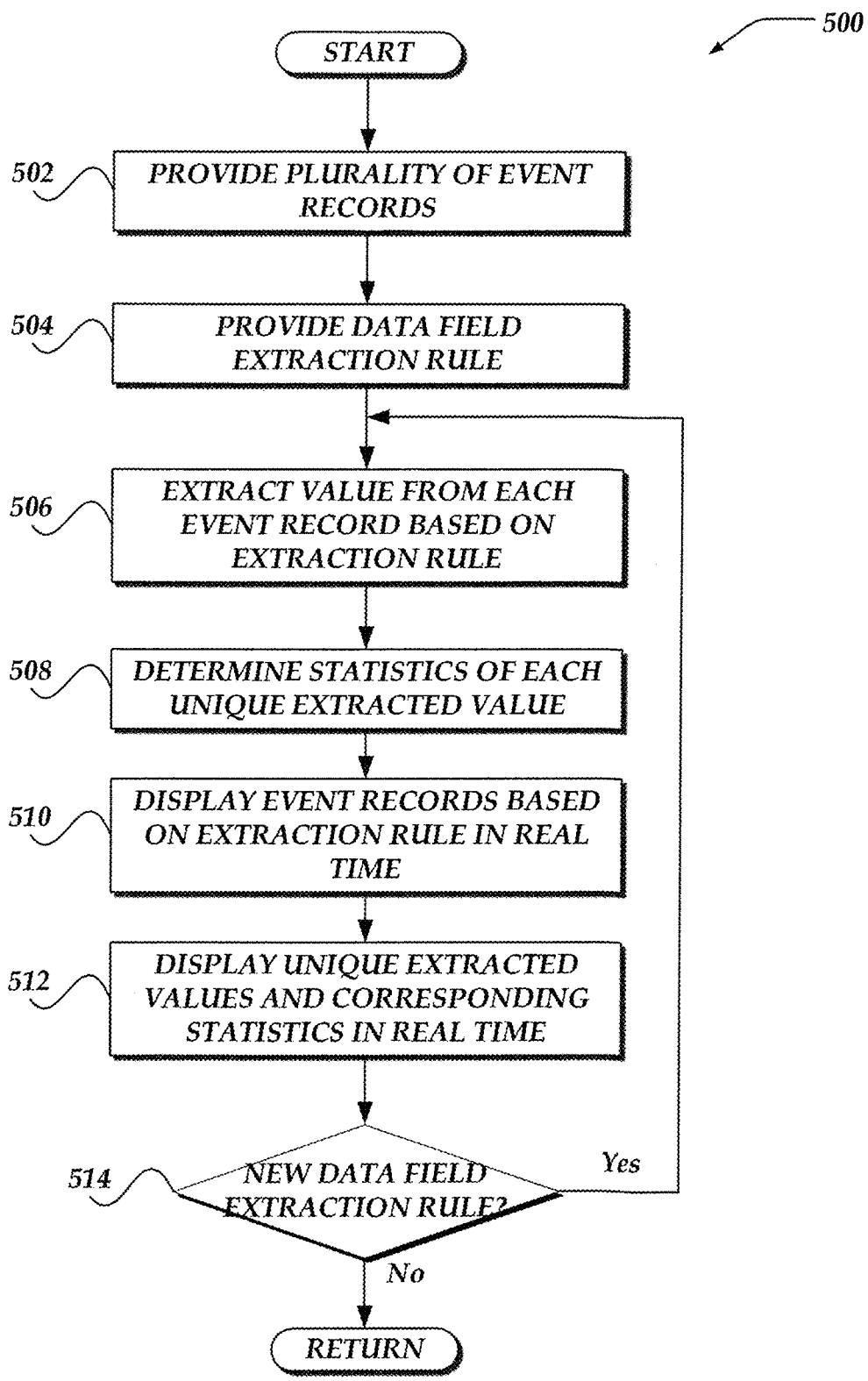
FIG. 5 illustrates a logical flow diagram generally showing one embodiment of an overview process for enabling real time display of extracted values and corresponding statistics for event records.

The operation of certain aspects of the invention will now be described with respect to FIGS. 5 through 7. FIG. 5 illustrates a logical flow diagram generally showing one embodiment of an overview process for enabling real time display of extracted values and corresponding statistics for event records. In some embodiments, process 500 of FIG. 5 may be implemented by and/or executed on a single network device, such as network device 400 of FIG. 4. In other embodiments, process 500 or portions of process 500 of FIG. 5 may be implemented by and/or executed on a plurality of network devices, such as network device 400 of FIG. 4. In yet other embodiments, process 500 or portions of process 500 of FIG. 5 may be implemented by and/or executed on one or more blade servers, such as blade server 250 of FIG. 2B. However, embodiments are not so limited and various combinations of network devices, blade servers, or the like may be utilized.

Process 500 begins, after a start block, at block 502, where a plurality of event records may be provided. In some embodiments, the event records may be provided by a plurality of different computing devices, such as client devices. In at least one embodiment, the plurality of event records may be a sample subset of a larger dataset of event records dataset. In some embodiments, the larger dataset of event records may be associated with one or more users and/or clients. As described above, the event records may be structured data and/or unstructured data. Additionally, the event records may include machine data.

Process 500 proceeds next to block 504, where a data field extraction rule may be provided. In various embodiments, the extraction rule may be automatically generated, manually input by a user, previously provided/created, provided by another system, or the like, or any combination thereof. The extraction rule may define a field within the plurality of event records from which to extract data (e.g., a field value). Accordingly, in some embodiments, the extraction rule may define a field within the event records independent of a predetermined and/or predefined structure of the event records.

In at least one embodiment, automatic generation of an extraction rule may be based on a value selected from an event record. In some embodiments, a graphical user interface (GUI) may be employed to enable a user to select desired text of an event record. From the selected text, pattern recognition algorithms may be employed to automatically generate the extraction rule. In at least one embodiment, the extraction rule may be a regular expression.

In another embodiment, the GUI may be employed to enable the user to manually input the extraction rule. In at least one embodiment, the user may enter a regular expression or other extraction rule into an editable input text box in the GUI to define a field within the event records from which to extract data. In yet other embodiments, the user may utilize the GUI to manually edit extraction rules— either previously automatically generated extraction rules or previous user-entered extraction rules.

As extraction rules are being generated and/or edited, the GUI may display real time updates of newly extracted values, statistics that correspond to the extracted values, changes to a display of the event records, or the like, or any combination thereof. Various embodiments of real time display of field values based on manual editing of extraction rules is described in more detail below in conjunction with FIG. 6.

In some embodiments, the GUI may be employed to enable a user to provide a field name for the extraction rule (e.g., the field defined by the extraction rule). In other embodiments, the system may automatically determine a field name for the extraction rule. In at least one such embodiment, the system may employ the extraction rule to extract a value from one or more event records. The field name may be determined based on this value, such as, for example, a datatype of the extracted value (e.g., an integer), a format of the extracted value (e.g., a phone number, URL, time/date format, or the like), or the like. In various embodiments, the extraction rule may be automatically generated, manually input by a user, or the like, or any combination thereof.

In any event, process 500 continues next at block 506, where a value may be extracted from each of the plurality of event records based on the extraction rule. In at least one of various embodiments, the extraction rule may be applied to each of the plurality of event records to determine what data to extract from each event record. The extracted data from a given event record may be the particular value for that event record for the field defined by the extraction rule. For example, if an extraction rule defines a field as the characters between a first set of single brackets, then the value for the event record "Dec 17 10:35:38 ronnie nslcd[23629]: [40f750] passwd entry uid" may be "23629".

Proceeding to block 508, at least one statistic may be determined for each unique extracted value. In at least one embodiment, a unique extracted value may be an extracted value that is different than another extracted value, regardless and/or independent of a number of instances that a value is extracted from the plurality of event records. For example, assume the extracted values from a six event records includes ["Bob", "Bob", "Ralph", "Bob", "John", "Ralph"]. The unique extracted values may be "Bob", "Ralph", and "John".

Based on the extracted unique values, statistics may be determined. In at least one embodiment, a statistic for a unique value may be a total number of times the unique value occurs in the plurality of records. In another embodiment, a statistic for a unique value may be a percent of a number of times the unique value occurs compared to a number of records in the plurality of records. In yet another embodiment, a statistic for a unique value may be a percent of a number of times the unique value occurs compared to a number of extracted values. This number may be different than a number of records in the plurality of records if the extraction rule does not result in a value being extracted from at least one event record. For example, assume an extraction rule defines a field as the characters between a first set of single brackets. If an event record does not include single brackets, then no value may be extracted. However, embodiments are not limited to these types of statistics and other statistics and/or metrics may also be employed.

Process 500 continues next at block 510, where the GUI may be employed to display the event records based on the extraction rule in real time. In at least one embodiment, the plurality of event records may be displayed to the user in virtually any order, such as, most recent to latest or the like. In at least one embodiment, displaying an event record based on an extraction rule may include emphasizing the field defined by the extraction rule (e.g., the extracted value) in the event record. Examples of such emphasizing may include, but are not limited to, highlighting, underlining, and/or otherwise identifying the value extracted from the event record. FIG. 8B illustrates one embodiment of real time display of event records, where values extracted based on an extraction rule are highlighted. In some other embodiments, a plurality of extraction rules may be employed for the plurality of event records and each corresponding extracted value may be emphasized (in a similar or different manner). In at least one embodiment, the values extracted from multiple extractions rules may be distinct and/or separate, and/or may partially or completely overlap.

In some embodiments, real time display of the event records may include displaying the event records based on an extraction rule as the extraction rule is being provided, entered, and/or edited by a user. Accordingly, the GUI may update a display of each event record and an indication of each extracted value in near real time as an extraction rule is edited/generated.

Process 500 proceeds next at block 512, where the GUI may be employed to enable real time display of the unique extracted values and the at least one corresponding statistic. In some embodiments where multiple extraction rules are employed, a set of unique extracted values and corresponding statistics may be displayed for each distinct extraction rule.

In some embodiments, real time display of the unique extracted values and the at least one corresponding statistic may include displaying the unique extracted values and the at least one corresponding statistic as the extraction rule is being provided, entered, and/or edited by a user. Accordingly, the GUI may update a display of a list of unique extracted values and the at least one corresponding statistic in near real time as an extraction rule is edited/generated.

It should be understood that real time or near real time display of data, as used herein, may include a delay created by some processing of the data, such as, but not limited to, a time to generate an extraction rule, a time to apply the extraction rule to the plurality of event records, a time to calculate corresponding statistics, and/or the like.

Process 500 may continue at decision block 514, where a determination may be made whether a new data field extraction rule has been provided. In at least one embodiment, a new data field extraction rule may be automatically provided. In another embodiment, a user may edit a previously provided extraction rule. If a new extraction rule is provided, process 500 may loop to block 506; otherwise, process 500 may return to a calling process to perform other actions.

Figure 6:
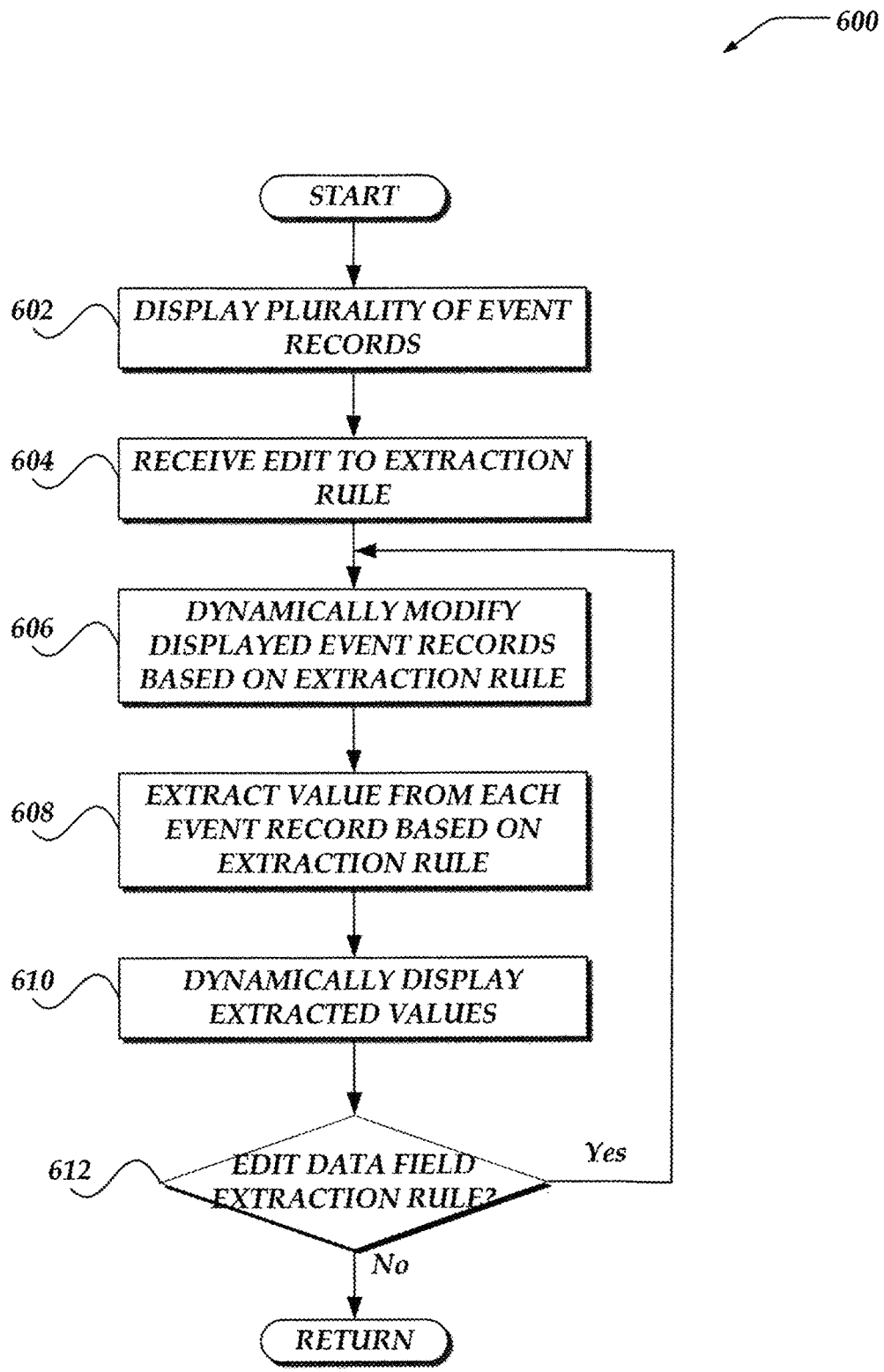
FIG. 6 illustrates a logical flow diagram generally showing one embodiment of a process for enabling real time display of event records and extracted values based on manual editing of a data field extraction rule.

FIG. 6 illustrates a logical flow diagram generally showing one embodiment of a process for enabling real time display of event records and extracted values based on manual editing of a data field extraction rule. In some embodiments, process 600 of FIG. 6 may be implemented by and/or executed on a single network device, such as network device 400 of FIG. 4. In other embodiments, process 600 or portions of process 600 of FIG. 6 may be implemented by and/or executed on a plurality of network devices, such as network device 400 of FIG. 4. In yet other embodiments, process 600 or portions of process 600 of FIG. 6 may be implemented by and/or executed on one or more blade servers, such as blade server 250 of FIG. 2B.

However, embodiments are not so limited and various combinations of network devices, blade servers, or the like may be utilized.

Process 600 begins, after a start block, at block 602, where a plurality of event records may be displayed. In some embodiments, a plurality of received event records may be displayed as a list of records, such as is shown in FIG. 8A. In at least one of various embodiments, block 602 may employ embodiments of block 502 of FIG. 5 to receive the plurality of event records for display.

Process 600 proceeds to block 604, where an input from a user that edits an extraction rule may be received. In at least one embodiment, a GUI may be employed to enable the user to edit an extraction rule. In one non-limiting, non-exhaustive example, an extraction rule (e.g., a previously generated or a newly generated extraction rule) may be displayed to the user in an editable text box. The user may then make edits to the extraction rule by typing in the text box. However, embodiments are not so limited and other graphical interface objects may be employed to enable a user to manually edit the extraction rule. In at least one of various embodiments, block 604 may employ embodiments of block 504 of FIG. 5 to provide an extraction rule, which may be edited by the user. In other embodiments, the user may manually enter an extraction rule starting from scratch. In some embodiments, the extraction rule may be displayed to the user as source code, which the user may modify to edit the extraction rule.

Process 600 continues next at block 606, where the displayed event records may be dynamically modified based on the edited extraction rule. In at least one embodiment, as the user edits the extraction rule, an emphasis of the field defined by the edited extraction rule for each event record may be modified in real time. For example, a highlighting of text in the event record (i.e., the extracted value) may be modified as the extraction rule is being edited that reflects the edited extraction rule. In at least one of various embodiments, block 606 may employ embodiments of block 510 of FIG. 5 to enable real time display of event records.

Process 600 proceeds next to block 608, where at least one value may be extracted from each of the plurality of event records based on the extraction rule. In at least one of various embodiments, block 608 may employ embodiments of block 506 of FIG. 5 to extract values from each of the plurality of event records.

Process 600 continues at block 610, where the GUI may be employed to dynamically display the extracted values in real time. In at least one embodiment, as the user is editing the extraction rule, the extracted values may change and those changes (e.g., the extracted values based on the edited extraction rule) may be displayed in real time. In some embodiments, a list of unique extracted values may be displayed. In at least one of various embodiments, block 610 may employ embodiments of block 512 of FIG. 5 to display unique extracted values. In some embodiments, statistics that correspond to the extracted values may also be displayed in real time, such as is described at block 508 and 512 of FIG. 5.

In any event, process 600 proceeds next to decision block 612, where a determination may be made whether an edit to the data field extraction rule was received. In at least one embodiment, this determination may be based on input from a user into the GUI, such as editing the extraction rule in an editable text box (e.g., as described at block 604). If the extraction rule was edited, changed, and/or otherwise modified by the user, then process 600 may loop to block 606; otherwise, process 600 may return to a calling process to perform other actions.

Figure 7:
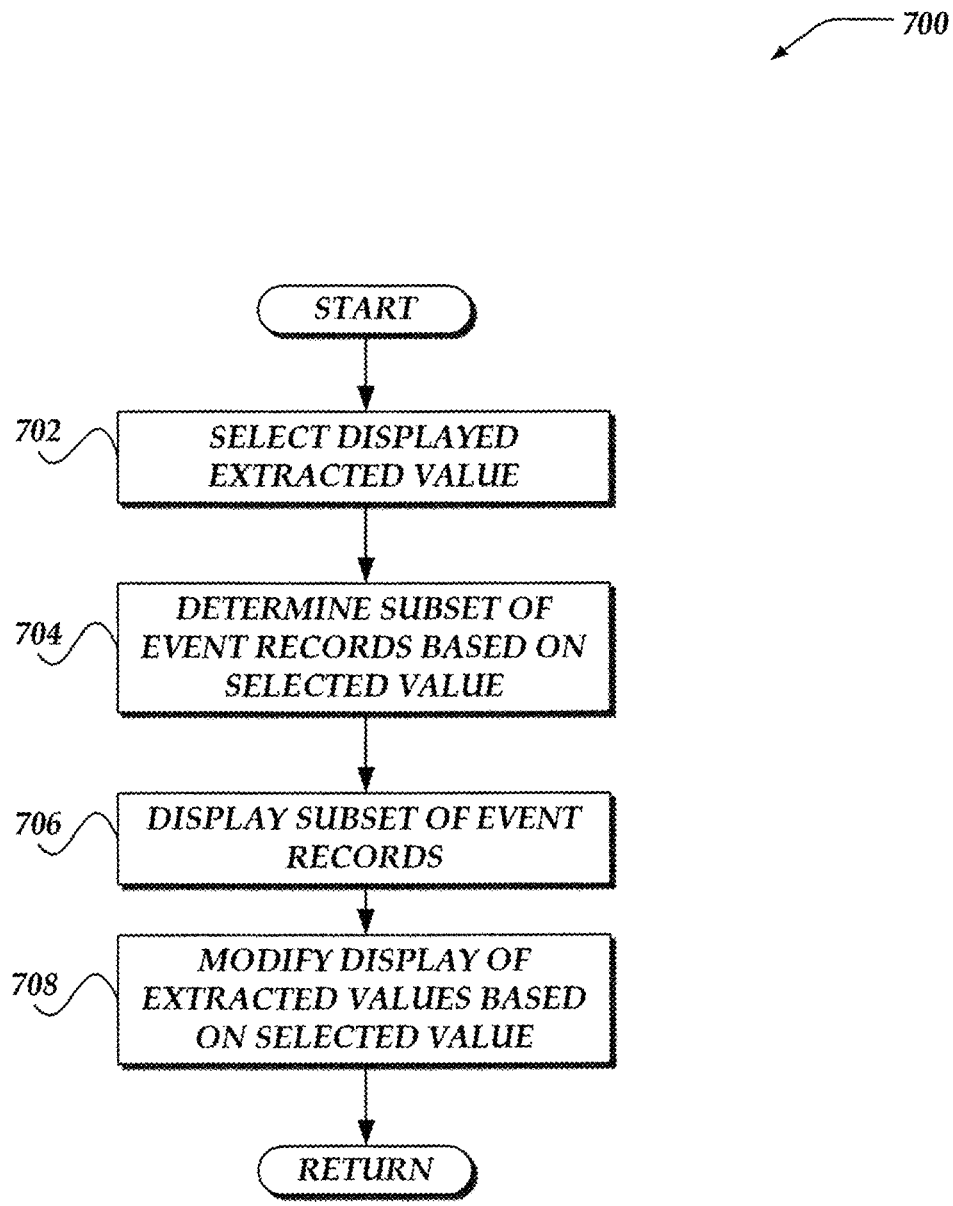
FIG. 7 illustrates a logical flow diagram generally showing one embodiment of a process for enabling the filtering of event records based on a selected extracted value.

FIG. 7 illustrates a logical flow diagram generally showing one embodiment of a process for enabling the filtering of event records based on a selected extracted value. In some embodiments, process 700 of FIG. 7 may be implemented by and/or executed on a single network device, such as network device 400 of FIG. 4. In other embodiments, process 700 or portions of process 700 of FIG. 7 may be implemented by and/or executed on a plurality of network devices, such as network device 400 of FIG. 4. In yet other embodiments, process 700 or portions of process 700 of FIG. 7 may be implemented by and/or executed on one or more blade servers, such as blade server 250 of FIG. 2B. However, embodiments are not so limited and various combinations of network devices, blade servers, or the like may be utilized.

In some embodiments, process 700 may be employed after process 500 or 600 is employed. For example, in at least one embodiment, process 500 may be employed to provide real time display of event records along with unique extracted values and their corresponding statistics. As described in more detail below, in some embodiments, process 700 may enable a user to filter the display of the event records based on a selection of a unique extracted value.

Process 700 begins, after a start block, at block 702, where an extracted value may be selected from a plurality of displayed extracted values. In some embodiments, the selection may be of a unique extracted value, such as displayed at block 512 of FIGS. 5 and/or 610 of FIG. 6. In at least one of various embodiments, the selection of the extracted value may be received through a GUI. The GUI may be employed to enable a user to select the extracted value. In at least one embodiment, the user may utilize a mouse or other pointing device to click on and select an extracted value. In some other embodiments, a user may select the extracted value by clicking on an identified value in an event record. However, embodiments are not so limited, and other mechanisms may be employed to enable a user to select an extracted value.

Process 700 proceeds next to block 704, where a subset of the plurality of event records may be determined based on the selected value. In at least one embodiment, the subset of event records may include those event records with a value (as extracted by the extraction rule) that is equal to and/or matches the selected value.

Process 700 continues at block 706, where the subset of event records may be displayed. In at least one embodiment, block 706 may employ embodiments of block 510 of FIG. 5 to display the filtered events based on the extraction rule. For example, assume that 100 event records are displayed to a user (e.g., at block 510 of FIG. 5), where a value extracted from each event record is highlighted in the event record. If a user selects extracted value "A", then of the 100 event records, those event records with an extracted value of "A" may be displayed to a user, such that any remaining event records may be hidden and/or otherwise distinguished from the event records with the extracted value of "A". In at least one embodiment, those event records that do not include an extracted value that matches the selected value may be hidden from view.

Process 700 proceeds next at block 708, where a display of the extracted values may be modified based the selected value. In some embodiments, the selected value may be emphasized (e.g., by highlighting, underlining, and/or otherwise identifying the selected value. In other embodiments, other extracted values (i.e., the non-selected value) may be hidden, dimmed, or the like, to indicate that they were not selected to determine the subset of event records.

After block 708, process 700 may return to a calling process to perform other actions. In some embodiments, a user may be enabled to select another extracted value, in which case, process 700 may process the newly selected extracted value. In other embodiments, the user may de-select the selected value, which may re-display the extracted values from the plurality of event records.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multiprocessor computer system. In addition, one or more blocks or combinations of blocks in the flowchart illustration may also be performed concurrently with other blocks or combinations of blocks, or even in a different sequence than illustrated.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Use Case Illustration

FIGS. 8A through 8C illustrate non-exhaustive examples of a use case of embodiments of a graphical user interface that may be employed to enable a user to create extraction rule and to obtain real time display of extracted values.

FIG. 8A illustrates a non-exhaustive example of a use case of an embodiment of graphical user interface that may be employed to enable a user to create extraction rule and to obtain real time display of extracted values. Graphical user interface (GUI) 800A may include multiple viewing windows and/or sections that each display information to a user. For example, GUI 800A may include records 808, input 802, input 806, extraction rule preview 804, records 808, and extracted values 810.

Records 808 may display each event record that is determined based on inputs 802 and 806. Input 802 may enable a user to input a data source (e.g., a specific database) and/or a data type (e.g., system log data). As illustrated, input 802 may include one or more pull down menus of available options of the data source and/or data type. However, other menus, lists, windows, or interfaces may also be employed. Input 806 may enable the user to define a specific filter to apply the event records (e.g., the user may filter the event records to display those event records that were recorded on a particular day). In other embodiments, input 806 may enable a user to select how the event records are selected for display. In at least one embodiment, event records 808 may include a subset and/or sampling of a lager data set. For example, input 806 may be used to select that event records 808 includes a predetermined number (e.g., 100) of the latest event records. However, other result types may be used, such as oldest, most popular, least popular, or the like, or any combination thereof.

Extraction rule preview 804 may display instructions to a user for creating an extraction rule. For example, the user may highlight and/or select text in an event record in records 808 to have an extraction rule automatically created. In another example, the user may manually enter an extraction rule (e.g., by clicking on the "Create extraction rule" button, an editable text box may open or become visible where the user can manually input an extraction rule). Extraction rule preview 804 may display the extraction rule after it is created, such as is shown in FIG. 8B. Additionally, the user may be enabled to save the extraction rule for additional processing of event records and extracted values.

Extracted values 810 may show unique values that are extracted from event records 808 based on an extraction rule provided by extraction rule preview 804. As illustrated, extracted values 810 may be empty because no extraction rule has been provided.

FIG. 8B illustrates a non-exhaustive example of a use case of an embodiment of a graphical user interface where an extraction rule has been provided. GUI 800B may be an embodiment of GUI 800A from FIG. 8A.

Extraction rule preview 804 may display the provided extraction rule. In at least one embodiment, GUI 800B may include editable text box 814 to enable the user to provide a field name of the field defined by the extraction rule. As described above, the extraction rule may have been automatically generated based on user selected text from an event record in the event records 808. In other embodiments, a user may have manually entered the extraction rule. As illustrated, the extraction rule may be displayed in editable text box 812. Editable text box 812 may enable a user to manually edit the extraction rule. As the user is manually editing the extraction rule, records 808 may be automatically and dynamically updated in real time to show new values extracted from each event record in records 808. For example, the extracted values from each event record may be highlighted or otherwise emphasized, as shown by highlight 824. Additionally, extracted values 810 may be automatically and dynamically updated in real time as the user edits the extraction rule.

In other embodiments, the extraction rule may be manipulated by indicating an incorrect extracted value (e.g., a counter-example). In at least one embodiment, a counterexample may be a value extracted from an event record based on an extraction rule that does not match a desired field of the user. For example, assume an extraction rule is created to define a field for a server name. However, assume the extraction rule extracts other data from at least one of the event records. The user may indicate this other data as a counter-example, and the system may automatically re-generate the extraction rule taking this counter-example into account. In at least one of various embodiments, a user may indicate a counter-example by clicking on a counter-example button, such as button 822. By clicking button 822, the system may automatically re-generate the extraction rule based on the counter example and the other extracted values.

Extracted values 810 may include one or more unique values extracted from records 808 based on the extraction rule. In at least one embodiment, statistics that correspond to each unique extracted value may be displayed. For example, data 816 shows a percentage of the number of times each particular unique value is extracted from records 808. As illustrated, each of these percentages may also be illustrated as a percentage bar (e.g., percentage bar 818) for each unique extracted value.

FIG. 8C illustrates a non-exhaustive example of a use case of an embodiment of graphical user interface that may be employed to enable a user to select an extracted value to filter the event records. GUI 800C may be an embodiment of GUI 800A of FIG. 8A.

In at least one embodiment, a user may click on one or more values within extracted values 810, such as value 820 to filter records 808. Records 808 may display those event records that include an extracted value that matches selected value 820. As illustrated, the display of extracted values 810 may be modified to indicate which value was selected by the user, such as by emphasizing the selected value and/or de-emphasizing the non-selected values.

Figure 9A:
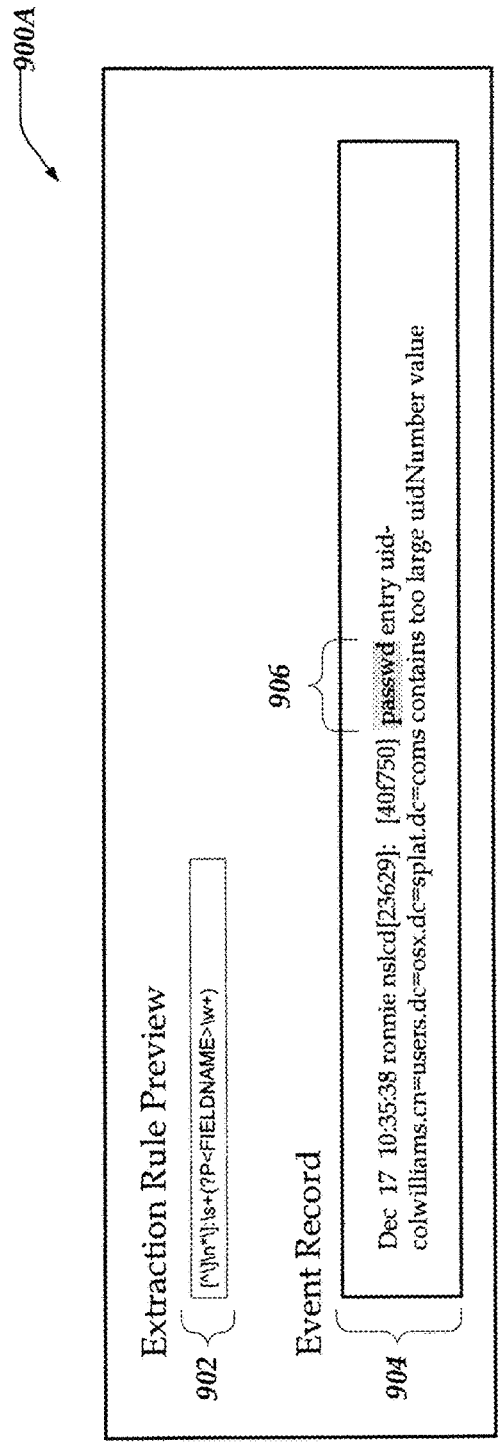
FIG. 9A illustrates a use case example of a real time display of an event record based on manual editing of an extraction rule.
Figure 9B:
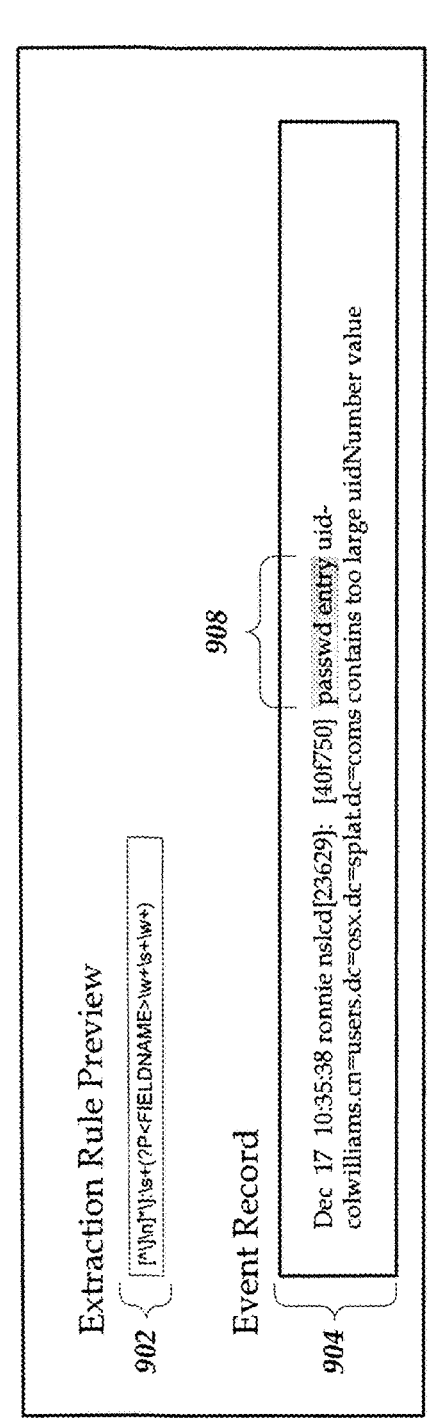
FIG. 9B illustrates a use case example of a real time display of an event record based on manual editing of an extraction rule.

FIGS. 9A and 9B illustrate a use case example of a real time display of an event record based on manual editing of an extraction rule. Example 900A illustrates extraction rule 902 and event record 904. Value 906 may be highlighted, or otherwise emphasized, as a value extracted from event record 904 based on extraction rule 902. Example 900B also illustrates extraction rule 902 and event record 904. However, as illustrated, extraction rule 902 may be manually edited by a user. Based on this edited extraction rule, value 908 may be highlighted as a new value extracted from event record 904 based on extraction rule 902.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A computer-implemented method, comprising:
   accessing a set of events in a field-searchable data store that acts as a persistent repository for the events that each include a portion of raw machine data in textual form being produced by a component within an information technology environment and reflecting activity within the information technology environment, wherein the field-searchable data store of events is field-searchable such that a plurality of search queries each containing at least one criterion for a field is executable against the events in the field-searchable data store to cause comparison between the at least one criterion and values extracted from the events by an extraction rule defining the field;
   determining a data type of a first field value in association with a first event;
   determining an extraction rule that extracts a second field value of the data type as the value of the field for a second event;
   applying the extraction rule to the portion of raw machine data in textual form in each event in the accessed set of events to extract a set of values;
   transmitting for display a user interface that includes a subset of events and that visually emphasizes, within each event of the subset of events, a field value extracted for the event by applying the extraction rule to the set of events;
   receiving a rejection of a visually emphasized field value extracted by applying the extraction rule to a particular event of the subset of events, the rejection indicating that the rejected field value in the particular event does not comprise a desired value to extract from the particular event via the extraction rule;
   based on the rejection of the visually emphasized field value of the particular event, automatically modifying the extraction rule such that the modified extraction rule extracts field values that are not the rejected field value in the subset of events when the modified extraction rule is applied and does not extract the rejected field value in the particular event when the modified extraction rule is applied; and
   transmitting for display an updated user interface presenting the subset of events, including the particular event with the rejected field value, wherein the rejected field value presented within the particular event is visually de-emphasized to indicate that the rejected field value in the particular event is not extracted.

2. The method of claim 1, wherein the set of events includes unstructured data.

3. The method of claim 1, further comprising:
   receiving a selected portion of text within an event that is not indicated as being extracted by the modified extraction rule; and
   modifying the modified extraction rule to extract the selected portion of text within the event.

4. The method of claim 1, wherein the extraction rule comprises a regular expression.

5. The method of claim 1, further comprising:
   displaying natural language representing the modified extraction rule;
   receiving an edit to the natural language;
   determining a new modified extraction rule corresponding to the edited natural language; and
   determining values to extract corresponding to the new modified extraction rule.

6. The method of claim 1, wherein the extraction rule is modified to bias against the rejected field value as a value for the field.

7. The method of claim 1 further comprising determining the extraction rule based on a selected portion of text within an event of the set of events.

8. A network device comprising:
   a transceiver that is operative to communicate over a network;
   a memory that is operative to store at least instructions; and
   a processor device that is operative to execute instructions that enable actions, including:
   accessing a set of events in a field-searchable data store that acts as a persistent repository for the events that each include a portion of raw machine data in textual form being produced by a component within an information technology environment and reflecting activity within the information technology environment, wherein the field-searchable data store of events is field-searchable such that a plurality of search queries each containing at least one criterion for a field is executable against the events in the field-searchable data store to cause comparison between the at least one criterion and values extracted from the events by an extraction rule defining the field;
   determining a data type of a first field value in association with a first event;

determining an extraction rule that extracts a second field value of the data type as the value of the field for a second event;

applying the extraction rule to the portion of raw machine data in textual form in each event in the accessed set of events to extract a set of values;

transmitting for display a user interface that includes a subset of events and that visually emphasizes, within each event of the subset of events, a field value extracted for the event by applying the extraction rule to the set of events;

receiving a rejection of a visually emphasized field value extracted by applying the extraction rule to a particular event of the subset of events, the rejection indicating that the rejected field value in the particular event does not comprise a desired value to extract from the particular event via the extraction rule;

based on the rejection of the visually emphasized field value of the particular event, automatically modifying the extraction rule such that the modified extraction rule extracts field values that are not the rejected field value in the subset of events when the modified extraction rule is applied and does not extract the rejected field value in the particular event when the modified extraction rule is applied; and transmitting for display an updated user interface presenting the subset of events, including the particular event with the rejected field value, wherein the rejected field value presented within the particular event is visually de-emphasized to indicate that the rejected field value in the particular event is not extracted.

9. The network device of claim 8, wherein the set of events include s unstructured data.

10. The network device of claim 8, wherein the set of events are stored in the field-searchable data store by indexing each event of the set of events.

11. The network device of claim 8, wherein the actions further comprise:

receiving a selected portion of text within an event that is not indicated as being extracted by the modified extraction rule; and modifying the modified extraction rule to extract the selected portion of text within the event.

12. The network device of claim 8, wherein the extraction rule comprises a regular expression.

13. The network device of claim 8, wherein the actions further comprise:

displaying natural language representing the modified extraction rule;

receiving an edit to the natural language;

determining a new modified extraction rule corresponding to the edited natural language; and determining values to extract corresponding to the new modified extraction rule.

14. A processor readable non-transitive storage media that includes instructions for generating extraction rules over a network, wherein execution of the instructions by a processor device enables actions, comprising:

accessing a set of events in a field-searchable data store that acts as a persistent repository for the events that each include a portion of raw machine data in textual form being produced by a component within an information technology environment and reflecting activity within the information technology environment, wherein the field-searchable data store of events is field-searchable such that a plurality of search queries each containing at least one criterion for a field is executable against the events in the field-searchable data store to cause comparison between the at least one criterion and values extracted from the events by an extraction rule defining the field;

determining a data type of a first field value in association with a first event;

determining an extraction rule that extracts a second field value of the data type as the value of the field for a second event;

applying the extraction rule to the portion of raw machine data in textual form in each event in the accessed set of events to extract a set of values;

transmitting for display a user interface that includes a subset of events and that visually emphasizes, within each event of the subset of events, a field value extracted for the event by applying the extraction rule to the set of events;

receiving a rejection of a visually emphasized field value extracted by applying the extraction rule to a particular event of the subset of events, the rejection indicating that the rejected field value in the particular event does not comprise a desired value to extract from the particular event via the extraction rule;

based on the rejection of the visually emphasized field value of the particular event, automatically modifying the extraction rule such that the modified extraction rule extracts field values that are not the rejected field value in the subset of events when the modified extraction rule is applied and does not extract the rejected field value in the particular event when the modified extraction rule is applied; and transmitting for display an updated user interface presenting the subset of events, including the particular event with the rejected field value, wherein the rejected field value presented within the particular event is visually de-emphasized to indicate that the rejected field value in the particular event is not extracted.

15. The media of claim 14, wherein the set of events include s unstructured data.

16. The media of claim 14, wherein the set of events are stored in the field-searchable data store by indexing each event of the set of events.

17. The media of claim 14, wherein the actions further comprise:

receiving a selected portion of text within an event that is not indicated as being extracted by the modified extraction rule; and modifying the modified extraction rule to extract the selected portion of text within the event.

18. The media of claim 14, wherein the actions further comprise:

displaying natural language representing the modified extraction rule;

receiving an edit to the natural language;

determining a new modified extraction rule corresponding to the edited natural language; and determining values to extract corresponding to the new modified extraction rule.

* * * * *